(12) United States Patent
Christopher et al.

(10) Patent No.: US 8,998,682 B2
(45) Date of Patent: Apr. 7, 2015

(54) DEVICES AND METHODS FOR AUTOMATICALLY CLEAVING AND ABRADING CABLES

(71) Applicant: kSARIA Corporation, Methuen, MA (US)

(72) Inventors: Anthony J. Christopher, Andover, MA (US); George Ciolfi, Hampton, NH (US)

(73) Assignee: kSARIA Corporation, Methuen, MA (US)

( * ) Notice: Subject to any disclaimer, the term of this patent is extended or adjusted under 35 U.S.C. 154(b) by 153 days.

(21) Appl. No.: 13/631,319

(22) Filed: Sep. 28, 2012

(65) Prior Publication Data
US 2013/0095732 A1  Apr. 18, 2013

Related U.S. Application Data

(60) Provisional application No. 61/540,271, filed on Sep. 28, 2011.

(51) Int. Cl.
| | | |
|---|---|---|
| *B24B 7/24* | (2006.01) | |
| *G02B 6/25* | (2006.01) | |
| *G02B 6/46* | (2006.01) | |
| *B29B 7/74* | (2006.01) | |
| *B01F 13/00* | (2006.01) | |
| *B01F 15/00* | (2006.01) | |
| *B01F 15/02* | (2006.01) | |
| *B01F 15/04* | (2006.01) | |
| *B05C 17/005* | (2006.01) | |
| *G02B 6/38* | (2006.01) | |
| *B01F 5/06* | (2006.01) | |

(52) U.S. Cl.
CPC .. *G02B 6/25* (2013.01); *G02B 6/46* (2013.01); *B29B 7/7447* (2013.01); *B01F 13/003* (2013.01); *B01F 15/00318* (2013.01); *B01F 15/0037* (2013.01); *B01F 15/0087* (2013.01); *B01F 15/0237* (2013.01); *B01F 15/042* (2013.01); *B05C 17/00553* (2013.01); *G02B 6/3857* (2013.01); *B01F 5/0615* (2013.01)

(58) Field of Classification Search
USPC .......... 451/44, 41, 70, 65, 461, 54, 55; 225/2, 225/96.5
See application file for complete search history.

(56) References Cited

U.S. PATENT DOCUMENTS

| | | | | |
|---|---|---|---|---|
| 4,291,502 | A | * | 9/1981 | Grimsby et al. ............... 451/271 |
| 4,944,079 | A | * | 7/1990 | Nakamura et al. ............ 29/33 M |
| 5,403,227 | A | * | 4/1995 | Franklin et al. ................ 451/168 |
| 6,099,392 | A | * | 8/2000 | Wiegand et al. ................ 451/41 |
| 6,695,191 | B1 | * | 2/2004 | Tabeling .......................... 225/95 |
| 2005/0058422 | A1 | * | 3/2005 | Doss et al. ..................... 385/137 |
| 2012/0141082 | A1 | * | 6/2012 | Sawicki et al. ................ 385/134 |

* cited by examiner

*Primary Examiner* — Robert Rose
(74) *Attorney, Agent, or Firm* — Choate, Hall & Stewart LLP

(57) ABSTRACT

An apparatus includes: a cleaver configured to automatically cleave a bare fiber extending from an end face of a terminus or connector of a fiber optic cable, the cleaver including a bending element configured to bend the bare fiber and a defect-formation device configured to create a surface defect in surface of the bare fiber under tension when the bare fiber is bent by the bending element; and an abrader configured to automatically finish the end face of the terminus or connector after the bare fiber is cleaved.

18 Claims, 23 Drawing Sheets

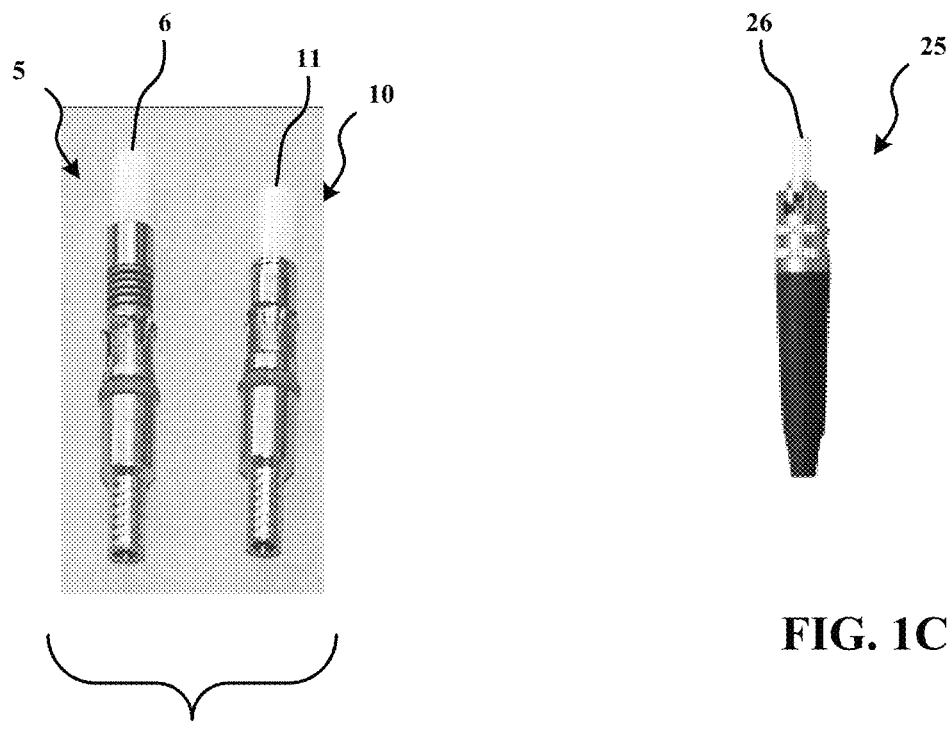
FIG. 1C
FIG. 1A
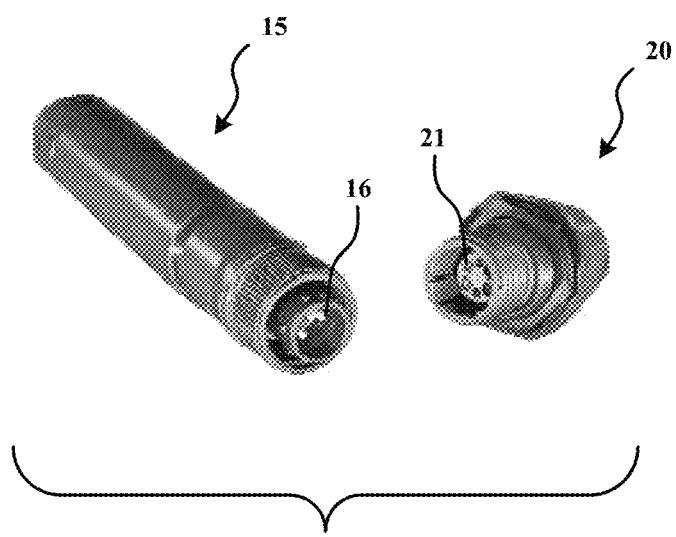
FIG. 1B

DEVICES AND METHODS FOR AUTOMATICALLY CLEAVING AND ABRADING CABLES

CROSS-REFERENCE TO RELATED APPLICATIONS

This application claims the benefit of U.S. application Ser. No. 61/540,271, filed Sep. 28, 2011 and entitled, "Epoxy Dispensing Tool, Modular Epoxy Curing Tool, and Cleave Epoxy Removal Tool," the contents of which are hereby incorporated by reference in their entirety.

BACKGROUND

Aboard ships or other watercraft, fiber optic infrastructure is installed in cableways using hangers for protection and routing. During shipbuilding, fiber optic cables are generally installed by either manually pulling the cables through the cableways or blowing them through micro-duct with compressed air. With both methods, the fiber cable is installed in the cableway without terminations/connectors.

Fiber optic terminations generally have highly polished ceramic end faces to provide optimal optical transmission and, as such, are extremely prone to damage by physical handling of the fiber cable ends during the pull-through process. Installation limitations generally require the optical fibers to be terminated, after routing, in-situ by hand, and prevent pre-termination of the fiber in a controlled manufacturing environment with precise process control.

The optical fiber termination process is very complex, in some cases having as many as 35 discrete steps, and many of the steps need to be performed to exacting tolerances in order to provide the desired performance levels and reliability. These steps make achieving high quality terminations difficult.

Further exacerbating the ability to achieve high quality terminations is the working environment aboard ships. The termination process typically occurs in confined areas and in heavily trafficked passageways making detailed precision assembly tasks more difficult to perform and highly prone to error.

Thus, there is a need for processes and advanced tools to simply and easily perform the termination process shipboard.

SUMMARY

In accordance with example embodiments of the present invention, a device includes: a cleaver configured to automatically cleave a bare fiber extending from an end face of a terminus or connector of a fiber optic cable, the cleaver including a stress applicator configured to stress the bare fiber and a defect-formation device configured to create a surface defect at a surface of the bare fiber under stress when the bare fiber is stressed by the stress applicator; and an abrader configured to automatically abrade the end face of the terminus or connector after the bare fiber is cleaved.

The defect-formation device may be a blade.

The stress applicator may be a bending element comprises a ramped surface configured to contact the bare fiber.

The device may further include a chuck configured to receive the terminus or connector.

The device may further include an index carriage configured to selectably move between a first position in which the cleaver is aligned with the chuck and a second position in which the abrader is aligned with the chuck.

The cleaver may be driven by a linear actuator.

A single continuous movement of the linear actuator in a single direction may cause the stress applicator and the defect-formation device to initially move distally to receive the bar fiber, and subsequently move laterally.

The defect-formation device may be configured to form the surface defect upon lateral movement of the cleaver.

The abrader may include a plate configured to press an abrasive tape against the end face of the terminus or connector.

The abrader may include an abrasion head.

The abrader may be configured to move the abrasion head relative the terminus or connector in an orbiting motion.

The abrasion head may be mounted to an eccentric shaft configured to move the abrasion head relative to the terminus or connector in an orbiting motion.

The device may further include an eccentric counterweight configured to orbit out of phase with the abrasion head when the abrasion head is moved in the orbiting motion.

The device may be battery powered.

The device may further include a controller configured to control and coordinate automatic operation of the cleaver and the abrader.

The controller may include a printed circuit board.

In accordance with example embodiments of the present invention, a replaceable cleave head may is configured to be received by a cleaving device configured to cleave a bare fiber of a cable, the cleave head including: a stress applicator configured to stress the bare fiber; and a defect-formation device configured to create a surface defect at a surface of the bare fiber under stress when the bare fiber is stressed by the stress applicator.

The cleaver may further include a shard container configured to retain fiber shards generated when the bare fiber is cleaved.

In accordance with example embodiments of the present invention, a replaceable cleave head is configured to be received by a cleaving device configured to cleave a bare fiber of a cable, the replaceable cleave head including: a cleaving mechanism configured to form a break across the bare fiber when the cleave head is actuated by the cleaving device; and a shard container configured to retain fiber shards generated when the break is formed across the bare fiber.

In accordance with example embodiments of the present invention, a method includes: automatically cleaving a bare fiber extending from an end face of a terminus or connector of a fiber optic cable; and automatically abrading the end face of the terminus or connector after the bare fiber is cleaved, the abrading causing removal of at least one of (a) an end portion of the optical fiber extending from the end face and (b) an epoxy exposed at the end face.

The automatically cleaving may include stressing the bare fiber.

The stressing the bare fiber may include bending the bare fiber.

The automatically cleaving may further include creating a surface defect at a surface of the bare fiber under stress when the bare fiber is in a stressed state.

The method may further include automatically transitioning between the automatically cleaving and the automatically abrading.

Further features and aspects of example embodiments of the present invention are described in more detail below with reference to the appended Figures.

BRIEF DESCRIPTION OF THE DRAWINGS

FIGS. 1A to 1C show various fiber cable termini.

DETAILED DESCRIPTION

An optical fiber may be inserted into a connector (also referred to herein as a "terminus") with an internal chamber filled with epoxy. The epoxy may be cured to secure the optical fiber within the connector.

Fiber optics are widely used throughout many military platforms, e.g., shipboard. Fiber optic technology provides many advantages over copper based technology by exhibiting reduced weight, significantly higher bandwidth, and immunity to EMI. Many new, advanced communication systems and sensing systems rely heavily on fiber optics as their underlying infrastructure.

Aboard ships or other watercraft, the fiber optic infrastructure is installed in cableways using hangers for protection and routing. During shipbuilding, fiber optic cable is generally installed with one of two methods.

In accordance with the first method, the cable is manually pulled through the cableways per Mil-Std-2042-1B. This technique is similar to installing electrical cable on Navy ships per DOD-STD-2003.

In accordance with the second method, the cable is blown through micro-duct with compressed air. Fiber optic cable installed in this manner is generally referred to as Blown Optical Fiber (BOF).

With both methods, the fiber cable is installed in the cableway without terminations/connectors. Referring to the examples illustrated in FIGS. 1A to 1C, fiber optic terminations 5, 10, 15, 20, and 25 have highly polished ceramic end faces 6, 11, 16, and 21, and 26 to provide optimal optical transmission and, as such, are extremely prone to damage by physical handling of the fiber cable ends during the pull-through process. In the case of blown optical fiber, the terminations cause further limitations by inhibiting the ability to carry the fiber cable through the duct with air pressure due to weight and size restrictions. These installation limitations typically require the optical fibers to be terminated, after routing, in-situ by hand, and prevent pre-termination of the fiber in a controlled manufacturing environment with precise process control. MIL-STD-2042-5B (United States Military Standard 2042-5B) outlines this manual procedure in detail and is used as reference through the shipbuilding industry.

Figure 2:
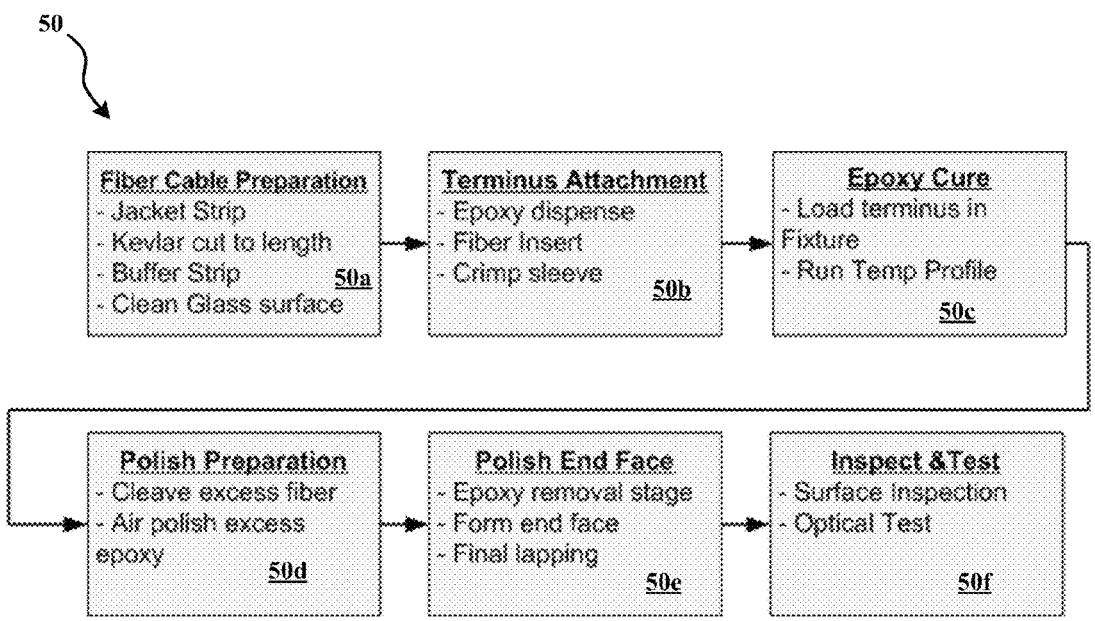
FIG. 2 is a flow chart of a method for terminating an optical cable.

The optical fiber termination process is very complex, in some cases having as many as 35 discrete steps. FIG. 2 shows, as an example, a method 50 with high-level base process steps involved with terminations, each with many sub-process steps not shown. Many of the steps need to be performed to exacting tolerances in order to provide the desired performance levels and reliability.

In the example illustrated in FIG. 2, the steps are grouped into five groupings 50a to 50f, which are generally performed sequentially.

The first grouping 50a is fiber cable preparation, which involves stripping the cable jacket, cutting Kevlar™, or other strengthening fibers, to length, stripping any buffer coating, and cleaning the surface of the glass fiber.

The second grouping 50b is terminus attachment, which involves dispensing epoxy used to bond the terminus to the prepared fiber cable, inserting the fiber into the terminus, and crimping a sleeve of the terminus to radially compress and hold the fiber cable extending therein.

The third grouping 50c is an epoxy cure, which involves loading the terminus in a fixture and running a temperature profile to cure the applied epoxy.

The fourth grouping 50d is polish preparation, which involves cleaving excess fiber, and removing excess epoxy.

The fifth grouping 50e is polishing and facing, which involves an epoxy removal stage, forming the end face of the fiber, and final lapping.

The sixth grouping 50f is inspection and testing, which involves both surface inspection for defects and optical testing.

Further exacerbating the ability to achieve high quality terminations is the working environment aboard ships. The termination process typically occurs in confined areas and in heavily trafficked passageways making detailed precision assembly tasks more difficult to perform and highly prone to error.

Providing processes and advanced tools to simply and easily perform the termination process for shipboard use is highly beneficial in improving quality, reducing operator training requirements, and reducing one of the major cost elements associated with installing fiber optics shipboard.

In accordance with example embodiments, a portable tool automatically performs the polish preparation process identified above.

The current method to prepare fiber terminations for polishing includes 2 discrete steps: (1) cleave and (2) epoxy removal/abrasion. Cleaving is performed to remove the excess glass fiber that extends from the terminus ferrule after curing is performed. The process includes using a sapphire scribe to manually make a small defect on the outside of the fiber in close proximity to the ferrule face. Once the defect is made, the technician stresses the fiber longitudinally to break the fiber at the defect point in a controlled manner. The intent is that the fiber makes a square, clean break across it diameter originating from the defect location. Because the glass is very fragile, this process is difficult to control by the technician and can easily break in an unwanted location. In a more severe failure mode of the process, the glass fiber breaks axially into the ferrule below the front surface. In this case, the terminus must be scrapped because the fiber will not polish completely. Further exacerbating the issue is that if this occurs on a multi-channel cable and all channels have been terminated, then all channels must be reworked in order to maintain the same length—a costly and time consuming fault.

The epoxy removal step follows the cleave step and is comprised of abrading, e.g., polishing, down the epoxy with abrasive film. The terminus is placed in a holder (puck) to hold the terminus square against the polishing film which resides on a flat surface. The technician applies a small amount of pressure to the terminus while moving it in a figure-8 motion on the abrasive film. The technician frequently inspects the terminus face to see if the epoxy has been removed completely. If not, the technician continues polishing. These steps are repeated until the epoxy is removed adequately. The technician must be very careful not to be overzealous with this process because the technician could polish off too much of the ferrule. If this occurs, the ferrule geometry could be affected which adversely affects mating the terminal with other termini.

Also, in more severe circumstances, the ferrule length can be altered to be too short and must be scrapped.

The following list indicates potential features of methods and devices in accordance with example embodiments:

Fully automatic operation—Automatic operation provides a more reliable process which is highly consistent as opposed to the current manual method. The consistency can positively affect tighter control over end face geometry of the ferrule which can decrease loss and increase overall interconnect reliability.

Reduction in training and requisite skill—Due to the fully automated operation of the example tool, the technician requires very little skill to perform this process step successfully and at high quality. The technician may only need to place the terminus in a clamp on the device and initiate the unit. This is in contrast to other devices and methods, which require a very practiced skill to perform reliably without causing axial cracks in the fiber or affecting ferrule geometry.

Reduced cost by minimizing scrap—automating the processes with highly effective methods can reduce cost by reducing the scrap rate as compared to other devices and methods. Scrap at this process step can be extremely costly, whereby if one terminus is scrapped on a multi-channel cable all others typically must be cut off and re-terminated in order to maintain consistent lengths for the connector installation, which is problematic for field installers.

Abrasive film or polishing film—an abrasive media used for material removal. This material may include a polyester backing material embedded with Silica Oxide or Diamond grit to provide abrasiveness.

An end face may refer to the end face the bare optical fiber, unless indicated otherwise.

A fiber extension may refer to the small amount of optical fiber that extends past the end face of a terminus after assembly step, but prior to polishing.

A backing plate may refer to the surface providing resistance to the bare fiber as it is pressed against the abrasive film.

Orbit speed may refer to the speed of relative rotary motion between the bare fiber end or end face and the abrasive film.

Figure 3:
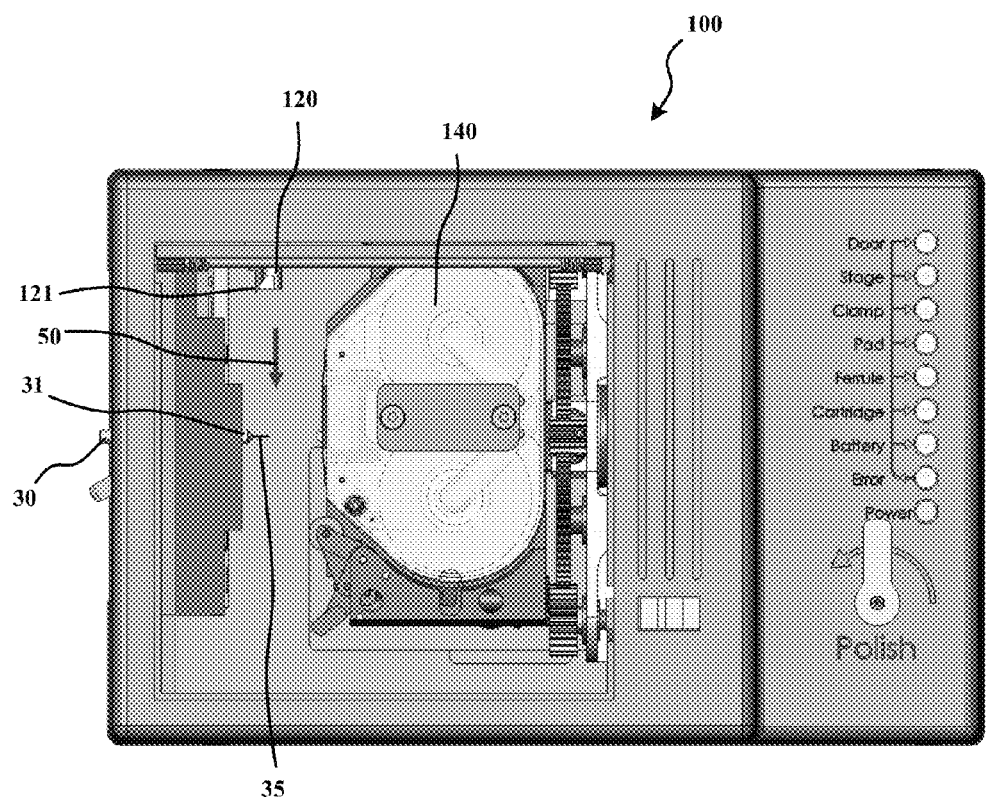
FIG. 3 shows an exemplary cleave/epoxy-removal tool in partial cross section.
Figure 4:
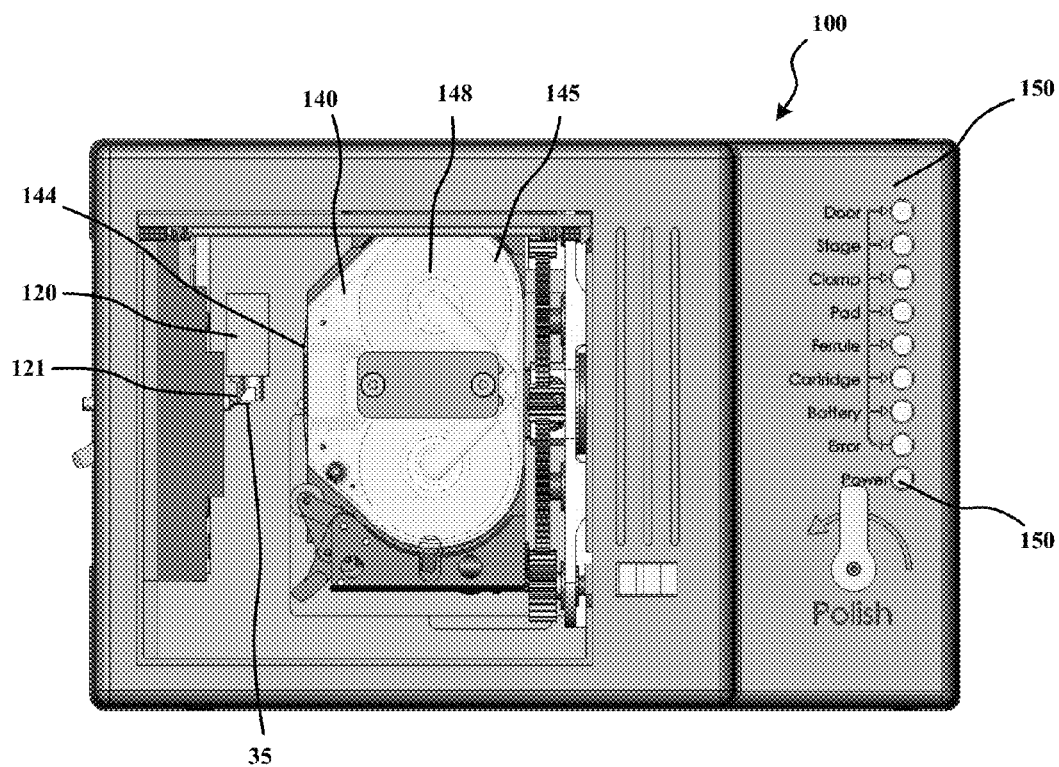
FIG. 4 shows the tool of FIG. 3 with a glass removal blade engaging a fiber.

Dwell time may refer to the time duration for which the bare fiber end or end face is in contact with the abrasive film Referring to FIG. 3, a tool 100 is configured such that both the cleave and epoxy removal processes are performed in one tool. The tool 100 functions, in one aspect, as a tip shaper and may be used for preparing fiber for mechanical splicing by, for example, precisely polishing a square flat surface on the tip of bare fiber without damage.

The tool 100 couples a cleaving mechanism 120 with a tip-shaping material-removal mechanism 140 to allow automation of the entire cleaving and epoxy removal process. The cleaving mechanism 120 moves downwardly in the direction of the arrow 50 in FIG. 3 in order to cleave the fiber 35, which extends from a ferrule 31 of a cable 30. Although the cleaving mechanism 120 of the illustrated implementation is configured to move in a downward direction, it should be understood that the cleaving mechanism 120 may be designed to move in any suitable direction or path from any suitable position to cleave the fiber 35.

Figure 5:
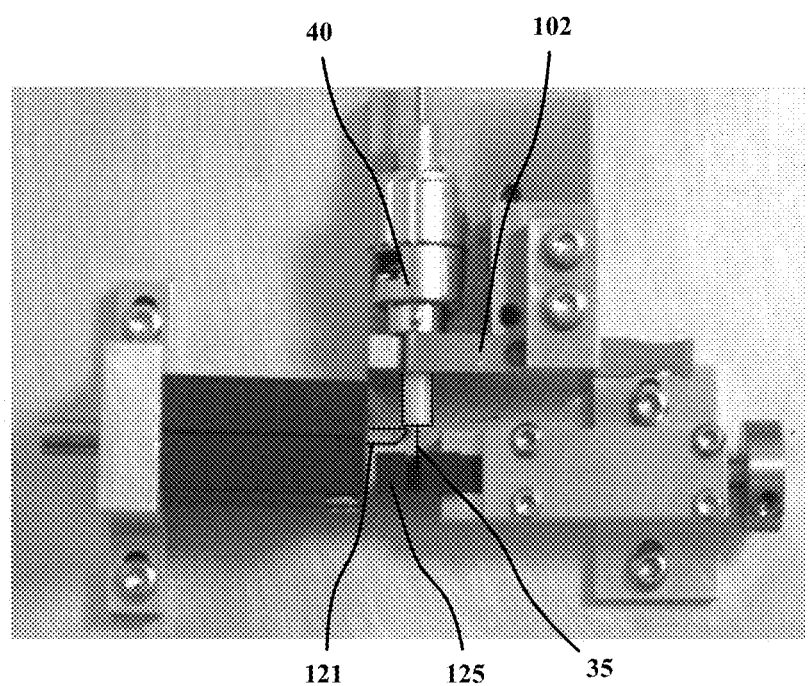
FIG. 5 shows an exemplary cleaving mechanism for cleaving optical fiber.

Referring to FIG. 5, the cleaving mechanism 120 may include a sapphire blade 121 and an anvil 125. In operation, the terminus 40 is held in a precision clamp 102 that accurately locates the ferrule tip. Once in place, the blade 121 may be automatically actuated to contact the fiber 35 radially with a controlled force to induce a surface defect. The blade motion may be controlled extremely accurately within the device 100 such that the fiber 35 does not break during this motion. Directly following the induction of the defect in the surface, an anvil is driven into contact with the fiber to apply a bending moment in a direction that imparts tension at the defect area. As the anvil continues to drive forward, a crack propagates across the diameter of the glass fiber to remove the excess. The glass shard may be collected within the device.

An objective of this implementation is to remove the excess fiber without significant axial cracking into the ferrule. The actual flatness of the surface is not a concern as it would be in conventional cleaving devices that are preparing the fiber for splicing. This allows the mechanism to be much less complex than other cleaving devices.

After the cleave operation is completed, the epoxy removal step is initiated, automatically in this implementation. This process includes first abrasively removing the small length of bare fiber 35 extending from the epoxy fillet on the front surface of the ferrule which was left after the cleaving mechanism 120 cleaved the bare fiber 35. The tip shaper 140 utilizes an abrasive film 144, which is provided via a film cassette 145. In particular, the abrasive film 144 is wound around two reels 387a and 387b. The film cassette may be, for example, a film cassette as described in U.S. Pat. No. 7,809,230, which is incorporated herein in its entirety by reference thereto.

The tip shaper 140 precisely controls an axial force applied to the bare fiber 35 so that the shaper 140 can grind the fiber 35 down without fiber breakage. In addition, the process may be controlled tightly enough that the fiber stub does not pierce or damage the surface of the abrasive film. The polishing process continues after the small fiber stub has been removed in order to remove the excess epoxy on the ferrule surface. This process is accomplished without altering the surface of the ferrule by i) controlling a light force, ii) abrasive film that minimizes ceramic material removal, and iii) specially designed film backing pad.

Figure 6:
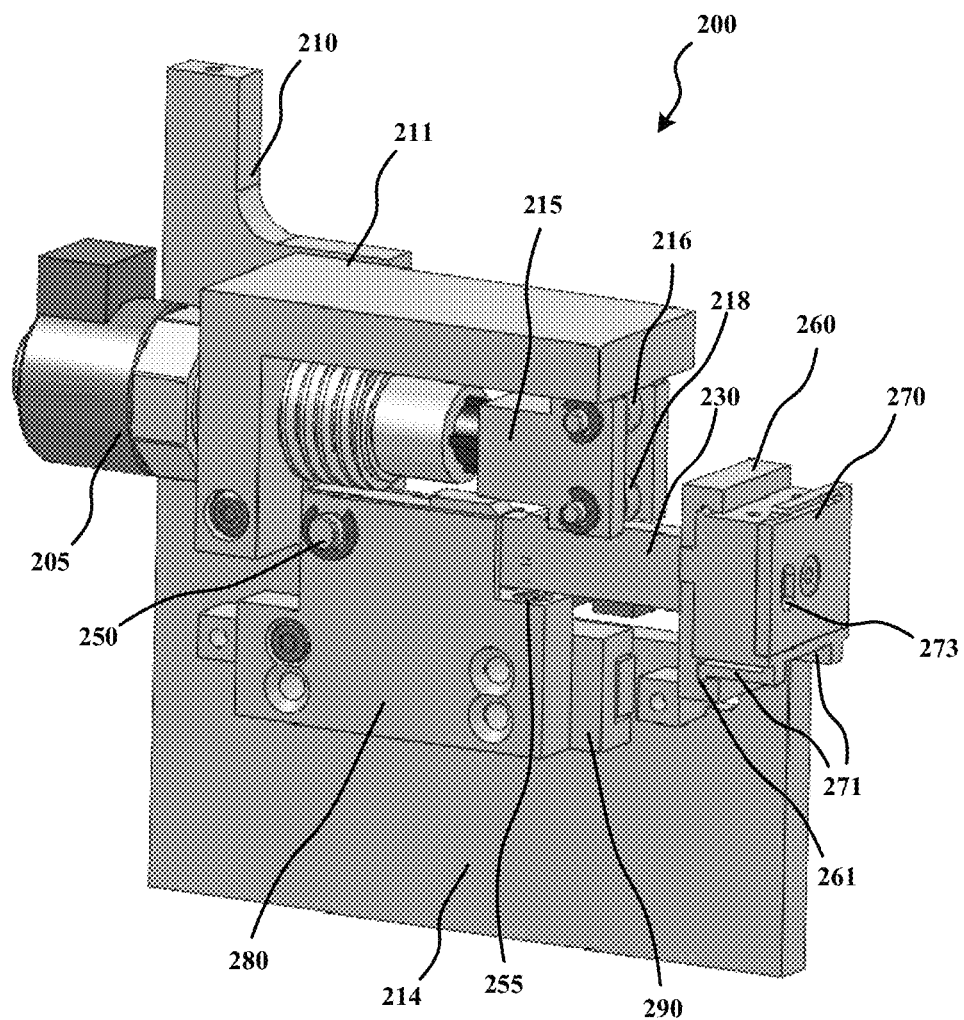
FIG. 6 shows another exemplary cleaving mechanism.

FIG. 6 shows an example cleaving assembly/cleaving mechanism 200. The cleaving mechanism 200 is powered by a linear actuator 205 that is mounted to a mount block 211 of a frame 210. The linear actuator 205 is configured to push an actuation block 215 to which the linear actuator 205 is coupled. The actuation block 215 is in turn configured to, in response to actuation provided by the linear actuator 205, push a cleave-head support member 230. The cleave-head support member is configured as a cantilevered beam extending from proximal pivot joint 250 to a head engagement cradle or dock 260, which securely receives a cleave head unit 270. The cleave head unit 270 may be removable to facilitate maintenance and/or replacement of the cleave head unit 270. For example, the cleave head unit 270 may be removed to remove fiber trimmings collected within the housing of the head unit 270 and/or to replace the blade or other crack-forming mechanism. In the implementation illustrated in FIG. 6, the cleave head unit 270 is releasably secured via a latching or detent engagement of a pair of spring arms 271 with a corresponding groove 261 of the cradle 260. It should be understood however, that the cleave head unit may be nonremovably attached to the support member 230.

The support member 230 is proximally mounted to a carriage 280 via the pivot joint 250. The carriage 280 is mounted to a vertical plate 214 of the frame 210 via a linear slide or bearing 290. The linear slide or bearing 290 allows the carriage 280 to move linearly proximally and distally along an axis parallel to an actuation axis of the linear actuator 205, while otherwise supporting and constraining the position of the carriage 280.

The support member 230 is also supported at a location distal to the pivot joint 250 via a spring 255, which in the illustrated example is a compression spring, although any type of spring or combination of springs may be provided. The spring 255 is coupled at a first end to an upwardly facing surface of the carriage and at an opposite second end to a downwardly facing surface of the support member 230, thereby exerting a spring force to urge or bias the support member 230 toward the actuation block 215.

The actuation block 215 is configured as a T-shaped clevis rotatably supporting a pair of guide wheels 216 and 218.

Figure 7:
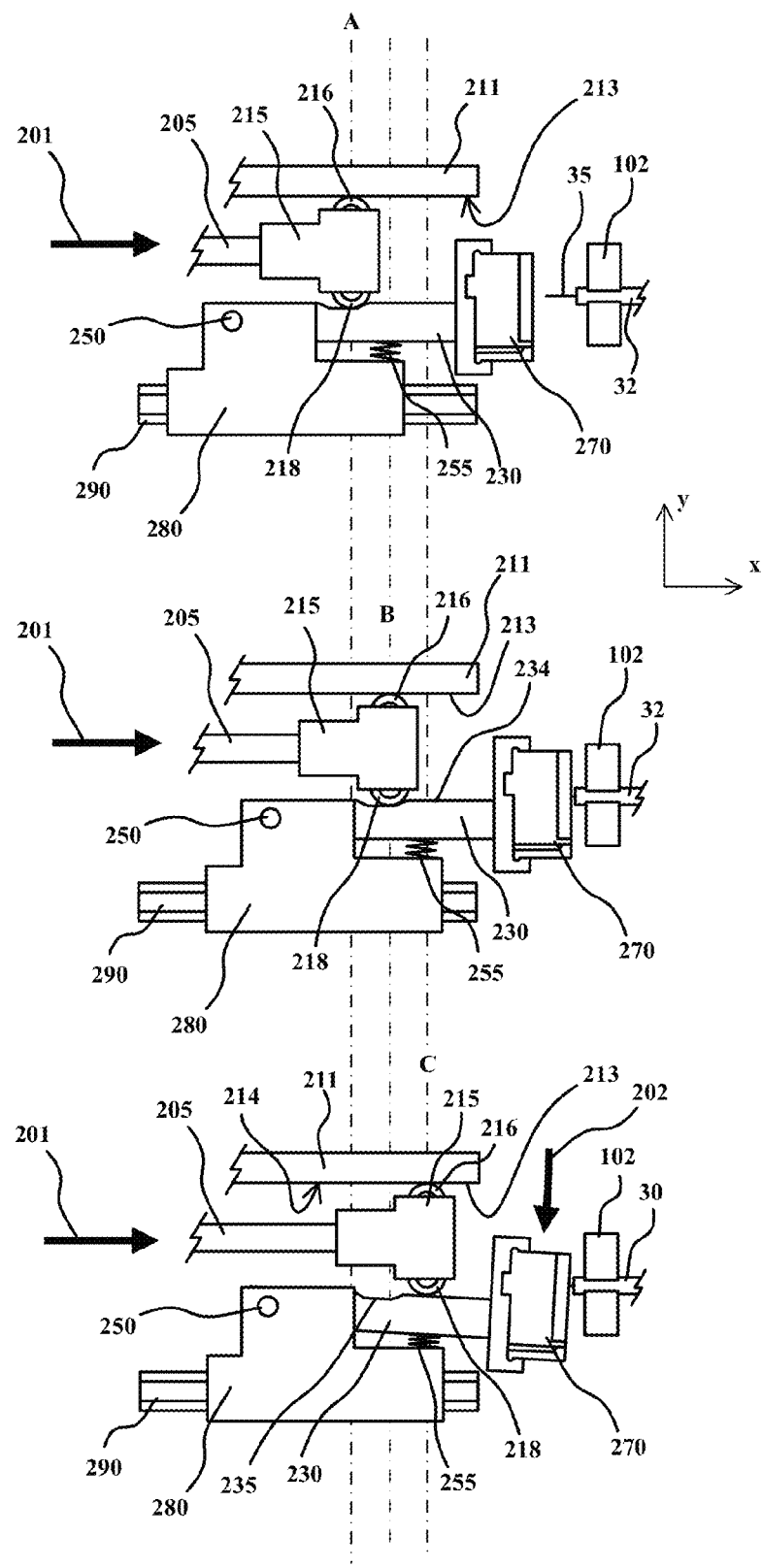
FIG. 7 sequentially illustrates actuation of the cleaving mechanism of FIG. 6.

Referring, for example, to FIG. 7, the upper guide wheel 216 is configured to contact and roll, along an axis parallel to the actuation axis of the linear actuator 205, along a first guide surface 213 corresponding to a downwardly facing surface of the block 211. The lower guide wheel 218 is configured to contact and roll along a second guide surface 234 which corresponds to the upper surface of the support member 230.

Figure 8:
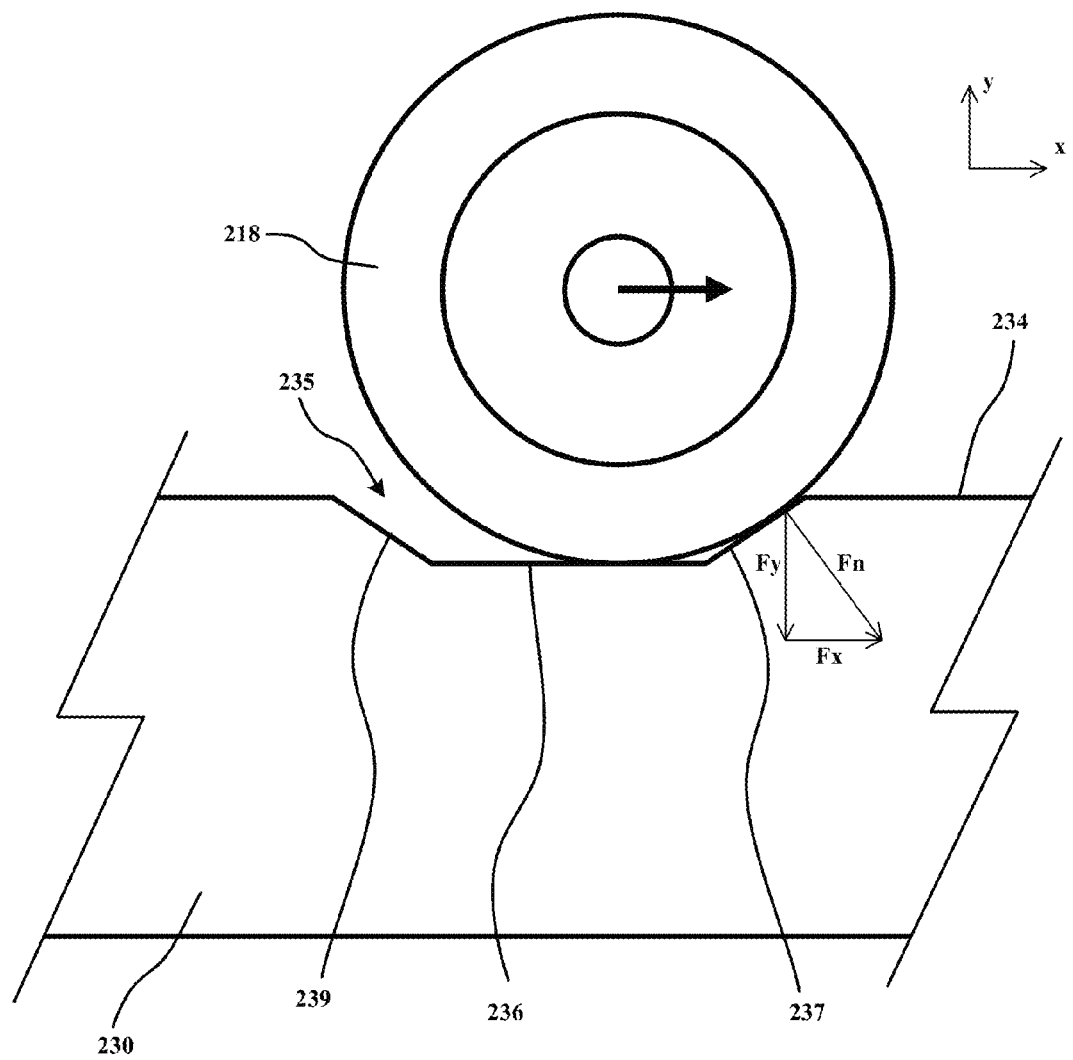
FIG. 8 shows an enlarged view of a lower guide wheel and a recess of a support member of the cleaving mechanism of FIG. 6.

Referring, for example, to FIG. 8, the second guide surface 234 includes a recess 235. Although the recess may have any suitable geometry, in the illustrated implementation the recess includes a flat lowered surface 236 disposed between a distal first sloped or ramped surface 237 and a proximal second sloped or ramped surface 239.

When the linear actuator 205 actuates the actuation block 215, the lower guide wheel 218 is driven in the linear actuation direction indicated by the arrow superimposed on the lower guide wheel 218 in FIG. 8 and also by arrows 201 in FIG. 7.

The spring 255 is selected to provide a force sufficient to maintain the recess 235 in contact with the wheel when the wheel is actuated in the linear actuation direction. Accordingly, contact and force transfer between the first ramped surface 237 and the lower guide wheel 218 causes the linear motion of the lower guide wheel 218 to be transmitted to the support member 230.

Referring to FIG. 7, a sequential operation of the cleaving mechanism 200 is illustrated. In an initial state, illustrated at the top of FIG. 7, the actuation block 215 is in a first position relative to frame 210 (not shown in FIG. 7) along the linear actuation axis. In the first position, the lower guide wheel 218 is at a location indicated by phantom line A. The spring 255 is pressing the support member 230 upwardly against the lower guide wheel 218, which is rotatably attached to the actuation block 215. The opposed upper side of the actuation block is supported against the upper guide surface 213 of the block 211 of the frame 210, thereby preventing lateral (in this implementation upward) movement of the actuation block 215 in response to the spring force and allowing the spring force to compress the support member 230 and the lower guide wheel together.

As the linear actuator 205 actuates the actuation block 215 in the actuation direction 201, the engagement between the lower guide wheel 218 and the first ramped surface 237 of the recess 235 transfers a force from the lower guide wheel 218 to the support member 230. In particular, referring to FIG. 8, where the linear actuator moves the lower guide wheel along the x-axis, a normal force Fn is exerted from the lower guide wheel 218 to the first ramped surface 237 at the point of contact between the lower guide wheel 218 and the first ramped surface 237.

The normal force Fn may be broken down into forces Fx and Fy acting along the x and y axes, respectively. Generally, the force Fx is equal to the force exerted from the linear generator 205 to the actuation block 215 along the x-axis, less any losses (e.g., frictional losses due to bearings of the guide wheels 216 and 218 and the linear bearing 290).

The force Fx causes the support member 230, which is supported by carriage 280 mounted on linear bearing 290, to move distally along the x axis. This movement of the support member 230 along the x axis accounts for the change of position from the first position, shown in the upper illustration of FIG. 7, to a second position, shown in the middle illustration of FIG. 7. As shown in the middle illustration of FIG. 7, the lower guide wheel 218 is aligned with phantom line B.

During the first portion of distal travel of the carriage 280, the engagement between the lower guide wheel 218 and the recess 235 is maintained due to the y-axis component of the spring force exceeding the force Fy and any other additional downward forces (e.g., the weight of the support member 230 and the actuation block 215.

The length of distal travel of the carriage 280 relative to the frame 210 has a set limit, which may be built into the linear bearing 290 and/or be set by any other suitable mechanism (e.g., a positive stop external to the linear bearing 290). As shown in the middle illustration of FIG. 7, the carriage 280 has reached its distal travel limit.

As the carriage 280 moves distally forward from the first position of FIG. 7 to the second position of FIG. 7, an entrance slot 273 on the cleave head unit 270, illustrated, for example, in FIG. 6, receives therethrough the end of the fiber 35 extending from the front face of a terminus 32 of the cable 30.

Once the carriage 280 hits the distal travel limit, the actuation block 215, in this example implementation, forces the lower guide wheel 218 out of the recess 235. In order to do so, the actuator exerts a force that results in the y component force Fy of the normal force Fn (coupled with any other downward forces due to, for example, the weight of system components) exceeding the y component of the spring force.

When the spring force is overcome, the lower guide wheel 218 is able to roll over and beyond the first ramped surface 237 to the position shown in the lower illustration of FIG. 7 and phantom line C, thereby causing downward rotation of the support member 230 about the pivot joint 250, as indicated by the direction of arrow 202.

The downward rotation of the support member 230 about the proximal pivot joint 250 causes a downward movement of the cleave head unit 270 disposed at the distal end of the support member 230. The action of the cleave head unit 270 causes bending of the fiber 35, contact between the fiber 35 and a blade or other surface-defect-causing mechanism, and, accordingly, a breakage or severing of the fiber 35, as further described, e.g., below.

As indicated above, as the carriage 280 moves distally forward from the first position of FIG. 7 to the second position of FIG. 7, the entrance slot 273 on the cleave head unit 270 receives therethrough the end of the fiber 35 extending from the front face of the terminus 32 of the cable 30. As the distal motion continues, the fiber encounters a ramp or other bending element 275, illustrated for example in FIGS. 9A to 9E, within the housing of the cleave head unit 270.

Figure 9A:
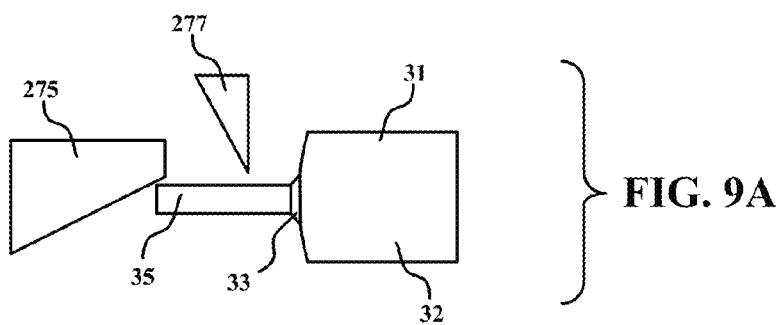
FIGS. 9A to 9E sequentially illustrate a cleaving procedure of the cleaving mechanism of FIG. 6.

FIG. 9A shows the fiber immediately prior to contacting the bending element 275.

Figure 9B:
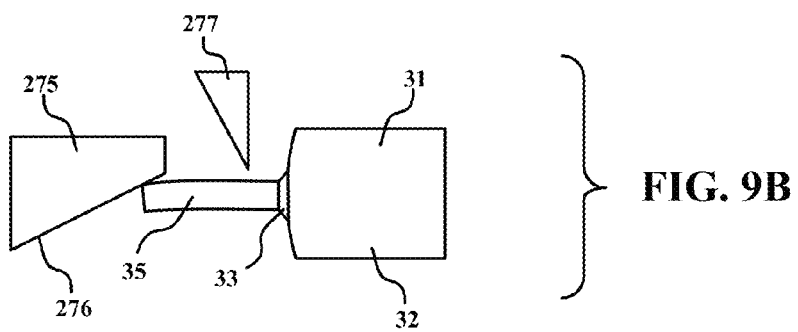

As illustrated in FIG. 9B, the bending element 275 contacts the free end of the fiber 35, which may correspond to position shown in the middle illustration of FIG. 7. At this stage the bending element 275, via ramped surface 276, bends the fiber 35, thereby placing at least one side surface of the fiber 35 in a state of tension.

Figure 9C:
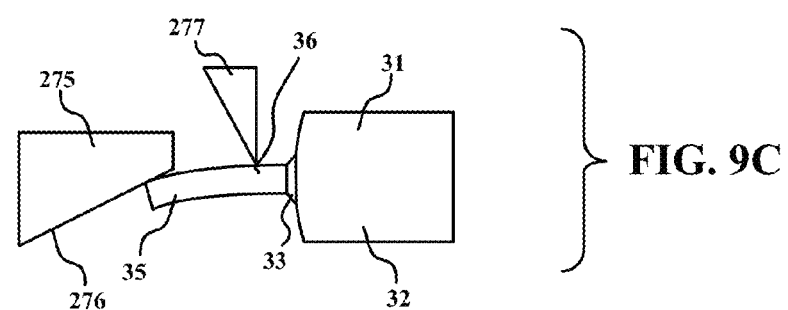

As the carriage 280 continues to move distally beyond the position shown in the middle illustration of FIG. 7, the movement of the lower guide wheel 218 over the surface profile of the support member 230 causes the cleave head unit 270 to move downwardly. This downward movement causes some additional bending of the fiber 35 and causes a cleave blade 277 to come into contact with the bent fiber 35 at a location on the surface of the fiber that is in tension, thereby producing a surface defect at a contact point 277, as illustrated in FIG. 9C, which may correspond to the position of the carriage 280 and cleave head unit 270 shown in the bottom illustration of FIG. 7, or a position that is between the position shown in the middle illustration of FIG. 7 and the bottom illustration of FIG. 7.

Figure 9D:
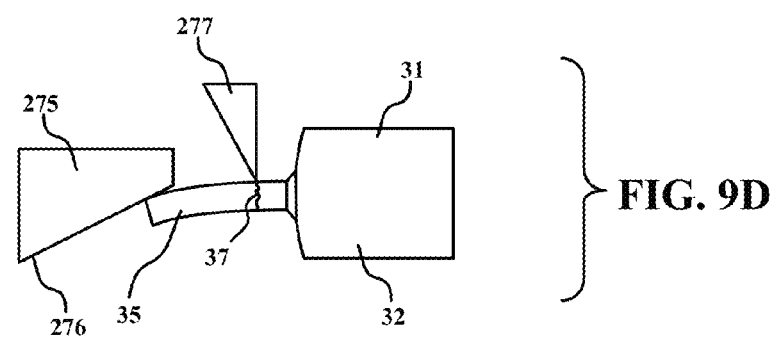
Figure 9E:
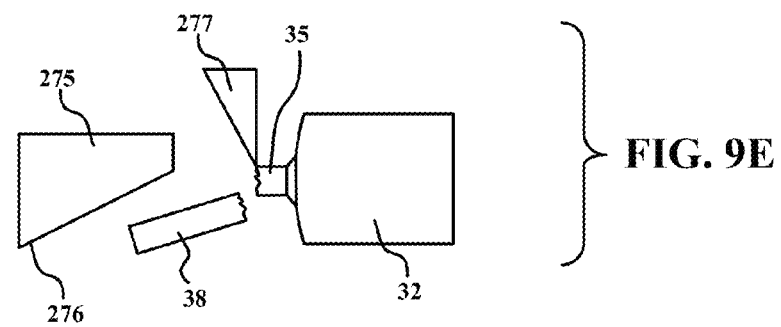

Upon formation of the surface defect on the surface of the fiber 35 at the contact point 36, the defect propagates, due to the tensile bending force exerted by the bending element 275, in a generally radial direction across the fiber to form a transverse crack 37 in the fiber 35, as illustrated in FIG. 9D. Upon the crack fully traversing the fiber 35, the end portion of the fiber 35 breaks free from the rest of the fiber 35, to form a shard 38, as illustrated in FIG. 9E. Due to the downward force exerted by the bending element 275, the release shard may be projected downwardly, where it may be retained within a compartment, e.g., an interior compartment of the cleave head unit 270. Maintaining the stored shards 38 in a specified compartment may, inter alia, enhance safety by minimizing the risk of an operator being cut by the shards 38.

By utilizing a small surface defect on a surface of the fiber 35 that is in a state of tension, the cleave head 270 is able to form a clean break of the shard 38, while preserving the structural and functional integrity of the remainder of the fiber 35. This mechanism reduces, or even prevents, unintended breakage and/or cracking of the fiber 35 at other locations along the fiber 35. An unintended crack or breakage to be desirably avoided by the cleave head 270 is illustrated at FIG. 10D. In particular, FIG. 10D shows a crack 39 at a location of the fiber 35 that is within the ferrule 31.

Although the illustrated implementation of FIGS. 9A to 9F includes a blade 277, it should be understood that any suitable element configured to create a structural defect on the surface of the fiber 35 may be provided.

Further, the cleave head unit 270 may be configured such that the fiber is not bent by the bending element 275 until the cleave head unit 270 begins its lateral, e.g., downward, motion. Moreover, the cleave head unit 270 may be configured such that the blade 277 or other element forms the surface defect prior to the bending element 275 bending the fiber 35.

Figure 10A:
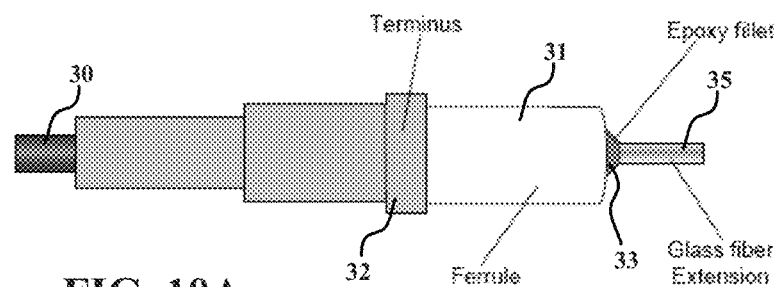
FIGS. 10A to 10C further illustrate a cleaving procedure of the cleaving mechanism of FIG. 6.
Figure 10B:
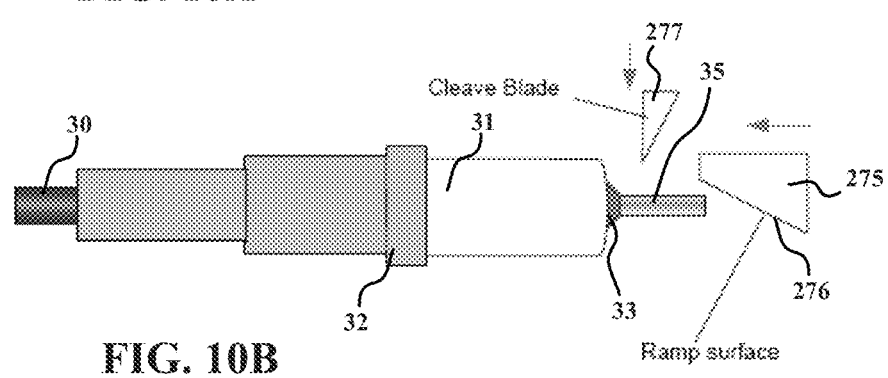
Figure 10C:
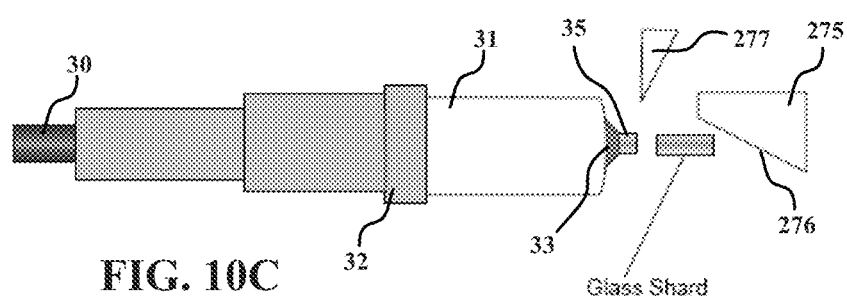
Figure 10D:
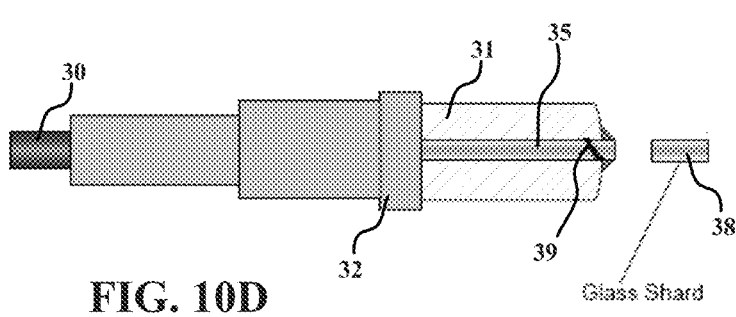
FIG. 10D shows an improperly cleaved fiber.

FIGS. 10A to 10C further illustrate a breakage of the fiber by the blade 277 and the bending element 275.

After the fiber has been cleaved by the cleave head unit 270, the cleave head unit 270 is proximally retracted. In order to retract the cleave head unit 270, the linear actuator 205 causes the actuator block 215 to move proximally such that the lower guide wheel 218 moves proximally from the position shown in the bottom illustration of FIG. 7 until the lower guide wheel 218 rolls into the recess 235. As the lower guide wheel 218 rolls into the recess 235, the upward bias of the support member 230, due to spring 255, causes the lower guide wheel 218 to remain in rolling contact with the recess 235. Accordingly, movement of the wheel 218 into the recess 235 results in the spring 255 pushing the support member 230 upwardly to rotate the support member 230 about the proximal pivot joint 250, thereby returning the cleave head unit to the position shown in the middle illustration of FIG. 7.

Further retraction of the actuation block 215 by the linear actuator 205 causes the lower guide wheel 218 to come into contact with second ramped surface 239 of the recess 235, with further retraction acting to move the support member 230, cleave head unit 270, and carriage 280 proximally and away from the cleaved fiber 35 until reaching the position shown in the top illustration of FIG. 7.

It should be understood that the surfaces 237 and 239 may have any suitable shape, e.g., non-ramped.

Referring to FIGS. 11 to 24, a cleave-and-epoxy-removal tool 1000 incorporates the cleaving mechanism 200 and generally shares features in common with the tool 100 except to the extent indicated otherwise herein.

The tool 1000 is a self-contained, battery-powered unit configured to automatically cleave and remove/polish epoxy of a terminus 32 of a fiber optic cable 30. Although the example device 1000 is battery powered, it should be understood that any suitable power source, including, e.g., a power grid, mechanical power (e.g., a hand crank), and/or solar power may be used alone or in combination with battery power to drive the device 1000.

Figure 11:
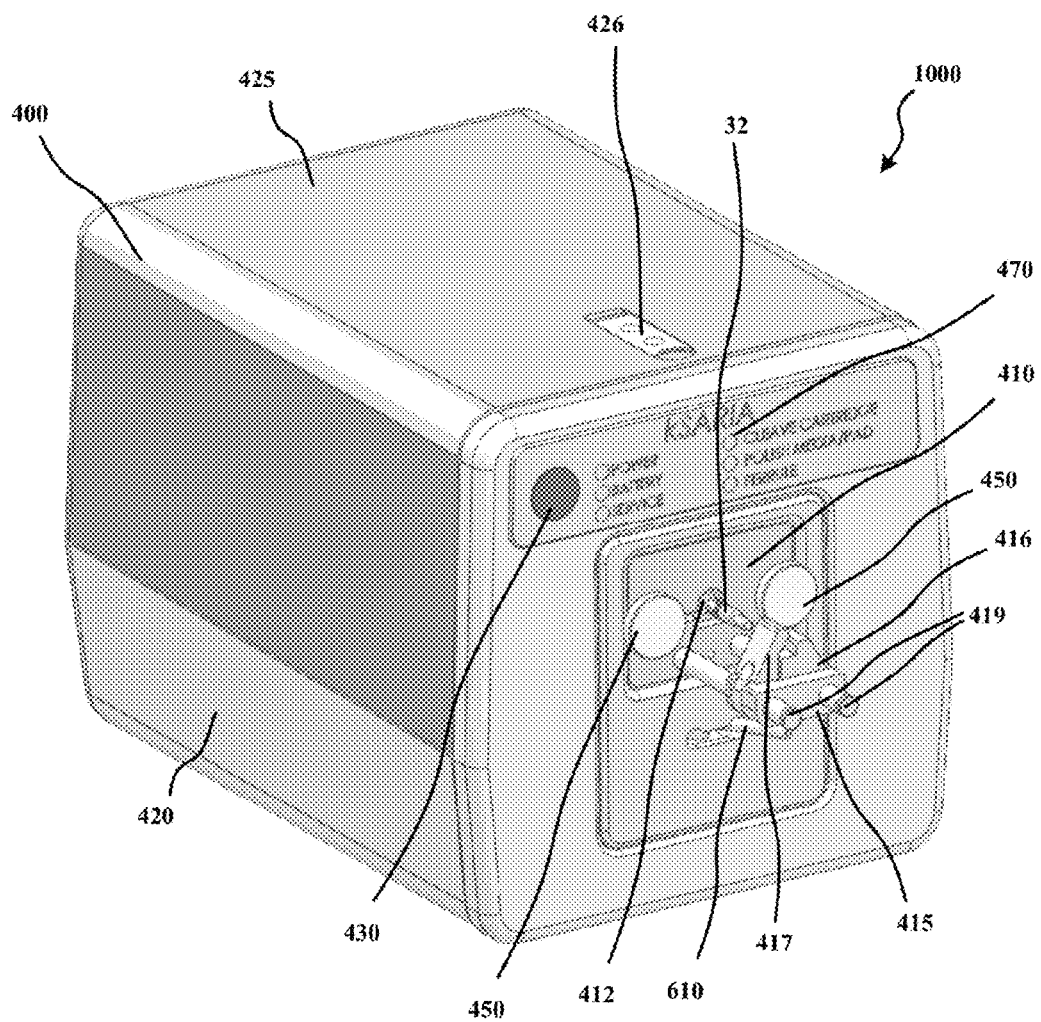
FIG. 11 shows an exemplary cleave/epoxy-removal tool that includes the cleaving mechanism of FIG. 6.

FIG. 11 shows the overall assembled device or tool 1000 with operator controls and indicators on the front face. The tool 1000 includes a case or housing 400 that includes two main parts—a base 420 and a top hood 425. The hood 425 rotates back via rear hinges to allow access to user replaceable parts within the unit 1000. A hood latch 426 is located on the top surface of the hood 425 to allow latching and unlatching of the hood in the closed position illustrated in FIG. 11.

To operate the device, the operator first inserts the terminus 32 into an opening or port 412 of a chuck unit 410 of the device 1000 such that the terminus 32 is clamped into position. It should be understood that although in certain implementations a particular terminus may be shown and/or described herein, any type of terminus and/or connector may be provided in connection with the various tools and methods described herein. The chuck 410 clamps the ferrule 31 and/or any other suitable portion of the cable 30 due to manual actuation of a lever 610. Although the chuck 410 is manually actuated via a lever 610 in the illustrated example, it should be understood that the chuck may be automatically actuated and any suitable actuation mechanism may be provided.

The chuck unit 410 further includes a guide mechanism to facilitate alignment and loading of the terminus 32 into the port 412 of the chuck unit 410 by the operator. The guide mechanism includes a guide block 415 that is supported by and movable along two parallel guide rails 419. The guide block 415 includes a base 416 and a rotatable clamp arm 417. The base 416 and clamp arm 417 are configured such that clamping of the terminus 32 between the base 416 and the lock arm 417 automatically aligns the longitudinal axis of the terminus 32 and the fiber 35 with the opening of the port 412. Accordingly, after clamping the terminus 32 into the guide block 415, subsequent movement of the guide block 415 along the guide rails 419 automatically guides the fiber 35 and the terminus 32 into the port 412, where the terminus 32 may be further clamped prior to processing. The guiding of the fiber 35 makes breakage or other damage to the fiber 35 less likely when inserting the end of the cable 30 into the opening of the port 412.

The chuck unit 410 in the example implementation is interchangeable with other similar chuck units that are configured to accommodate different types and/or sizes of connectors/termini, such that the various chuck units serve as ferrule adapters. The interchange of the chuck units may involve, for example, opening an access door on the case of the tool, removing one adapter and replacing it with another. In the illustrated implementation, the chuck units are held in place with two thumb screws 450 such that no tools are required.

After securing the ferrule 31 of the cable 30 in the chuck, the operator initiates the automated cleave and epoxy-removal process by actuating a user input, which in the illustrated implementation is a button 430. The device or tool 1000 then begins the automated process by controlling the cleaving mechanism 200 in the manner described above in order to cleave the exposed end of the fiber 35.

Figure 12:
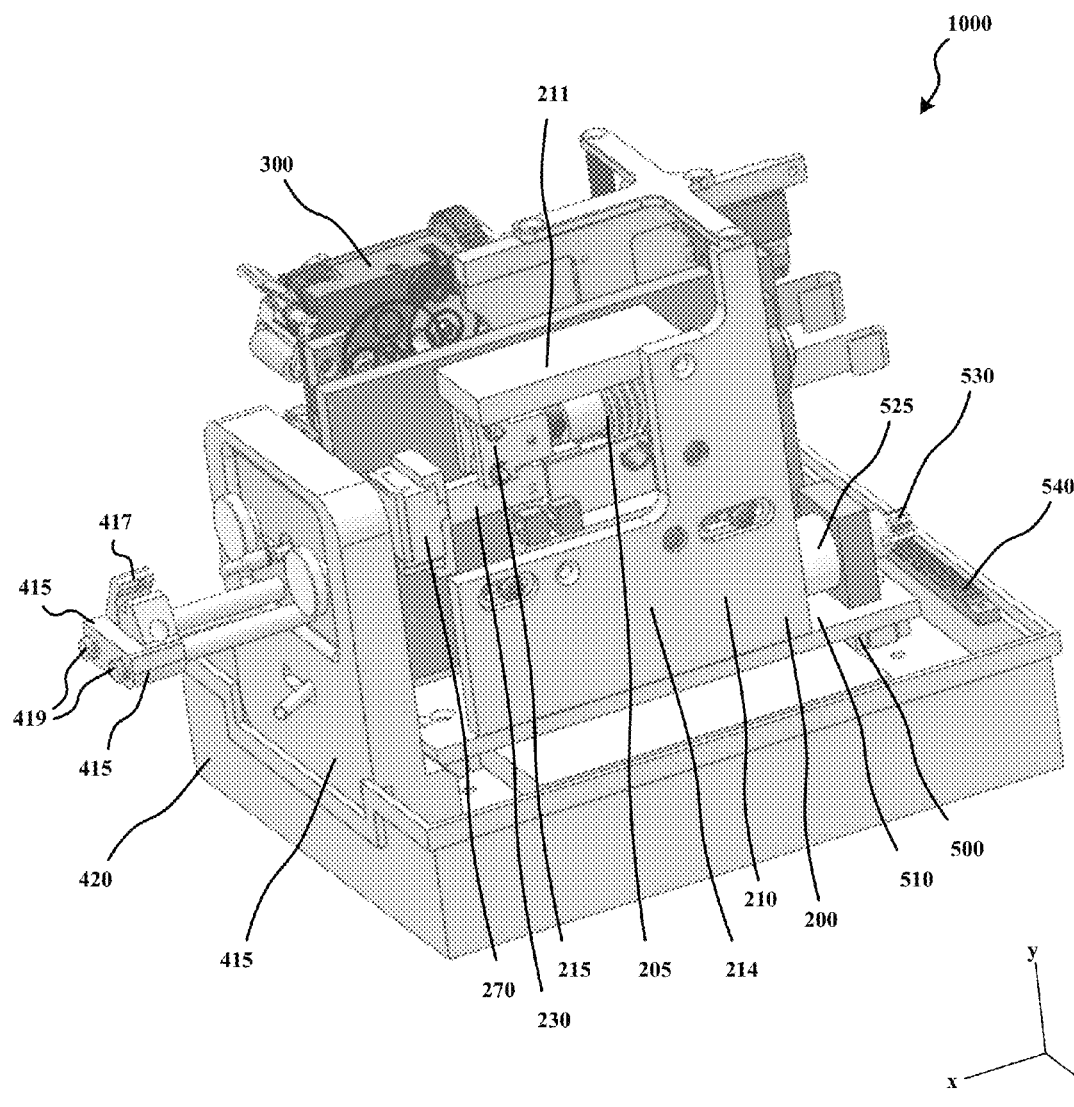
FIG. 12 shows the tool of FIG. 11 with a hood removed.

Referring to FIG. 12, the cleaving mechanism is mounted, via its frame 210, to an index carriage 510, which is part of linear slide table mechanism 500, the base of which is mounted to a housing base 420 such that the carriage 510 is slidably supported for motion along the z axis relative to the housing base 420.

The position of the index carriage 510 relative to the housing base 420 is set by an index drive that includes an index actuator in the form of an index motor 525, a drive gear or pinion 530, and a linear gear or rack 540. The housing or stator of the index motor 525 is mounted to the index carriage 510, and the pinion 530 is mounted to the rotary output shaft of the motor 525. The rack 540 is mounted to the housing base 420.

The gear teeth of the pinion 530 the gear teeth of the rack 540 to form a rack-and-pinion system configured to linearly move the index carriage 510 in either direction along the z axis with respect to the housing base 420 and/or to maintain a set position of the index carriage 510 along the z axis with respect to the housing base 420. This control is achieve by selectively driving the index motor 525 to achieve desired rotation and/or position of the pinion 530.

Although the index drive system of the illustrated implementation includes a rack mounted to the housing and a drive motor mounted to the index carriage, it should be understood that the mounting may be reversed, such that the drive motor is mounted on the housing and the rack is mounted in the index carriage.

Moreover, although the index drive system of the illustrated implementation includes a rack, pinion, and rotational motor, it should be understood that any suitable actuation system (e.g., mechanical, electro-mechanical, hydraulic, piezoelectric, and/or pneumatic actuation systems of any suitable type) may be provided for the index drive or any other drive/actuation system described herein.

After the operator has initiated the overall process, the index carriage 510 should be in a first position, as illustrated in FIG. 12, relative to the housing base 420, such that the cleaving mechanism 200, which is mounted to the index carriage 510, is aligned with the clamped terminus 32. In particular, in the illustrated example, the cleaving mechanism should be at a position along the z axis such that actuation of support member 230 and the cleave head unit 270 along the x axis causes the free end of the fiber 35 to enter the entrance slot 273 of the cleave head unit.

If the index carriage 510 is not in the first position, illustrated in FIG. 12 upon the operator initiating the overall process, the device 1000 may automatically actuate the index carriage, e.g., via controlling index motor 525, to move the index carriage 510 along the z axis to the first position. Furthermore, the tool/device 1000 may be programmed and/or otherwise configured to automatically move the index carriage 510 to the first position at the beginning of the overall process and/or at the end of the overall process. Automatically moving the index carriage 510 to the first position at the end of the overall cleave-and-epoxy-removal process may be suitable for preparing for subsequently initiated cleave-and-epoxy-removal processes.

After the cleaving process, such as, e.g., the process described herein in connection with the cleaving mechanism 200, the device 1000 initiates an epoxy-removal process in order to finish, e.g., polish, the end face of the terminus 32.

The epoxy-removal process is performed by an epoxy-removal mechanism 300. Prior to removing epoxy from the end face of the terminus 32, the index carriage 510 is actuated via the index drive system to move along the z axis until the epoxy-removal mechanism 300 is aligned with the terminus 32.

Figure 13:
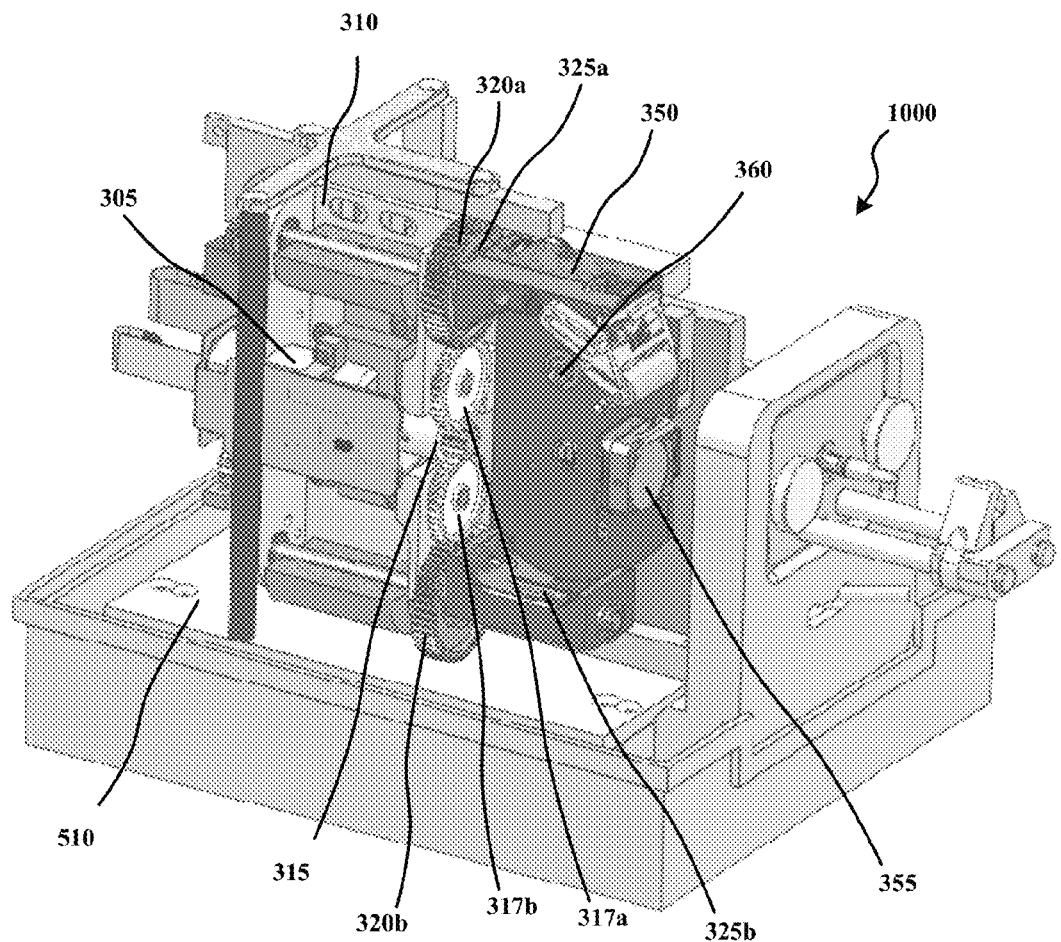
FIG. 13 shows a subassembly of the tool of FIG. 11 including an abrasion mechanism.
Figure 20:
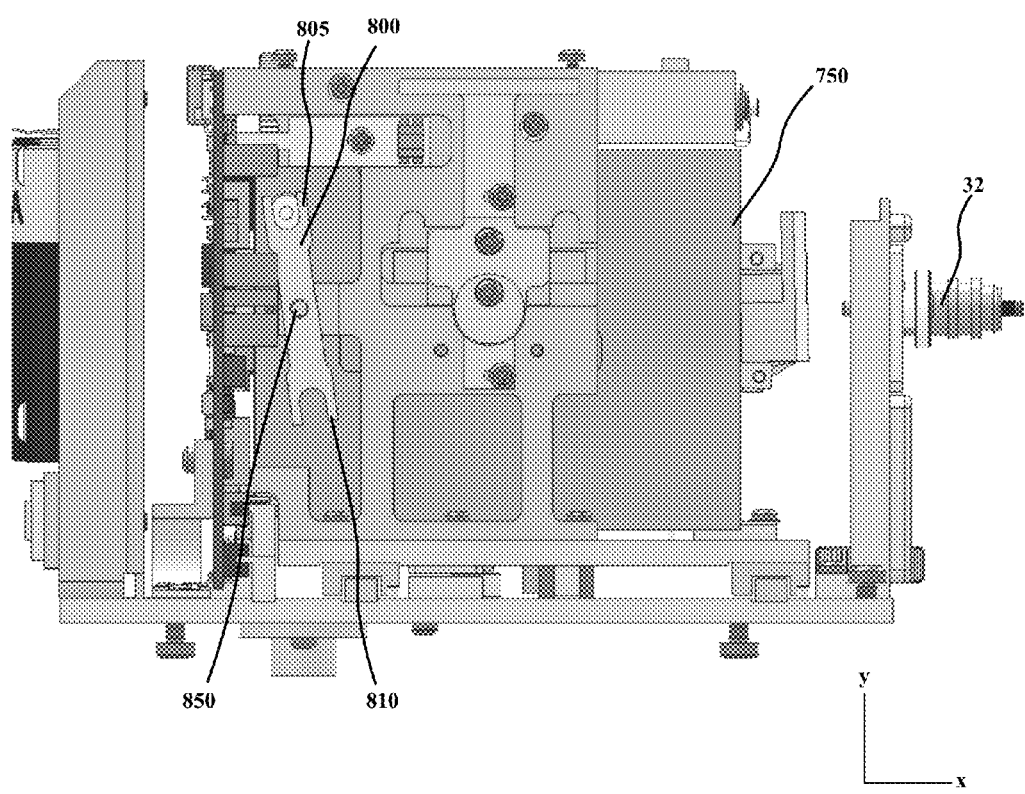
FIG. 20 shows a side view of a subassembly of the device of FIG. 11 with a chucked cable and in a state corresponding to an engaged position of the abrasion head.

Referring to FIGS. 13 and 20, the epoxy-removal mechanism 300 includes a frame 31 that is mounted to the index carriage 510.

Mounted to the frame 310 is a rotational actuator 305 in the example form of a motor. The output shaft of the motor 305 is mounted to a drive gear 315, such that actuation of the motor 305 causes the drive gear 315 to rotate about its axis.

The drive gear 315 is part of a gear train configured to deliver rotational power from the motor 305 to a pair of orbit gears 320a and 320b. In particular, the teeth of the drive gear engage teeth of a first idler gear 317a and a second idler gear 317b, which in turn engage teeth of the first orbit gear 320a and the second orbit gear 320b, respectively.

Figure 15:
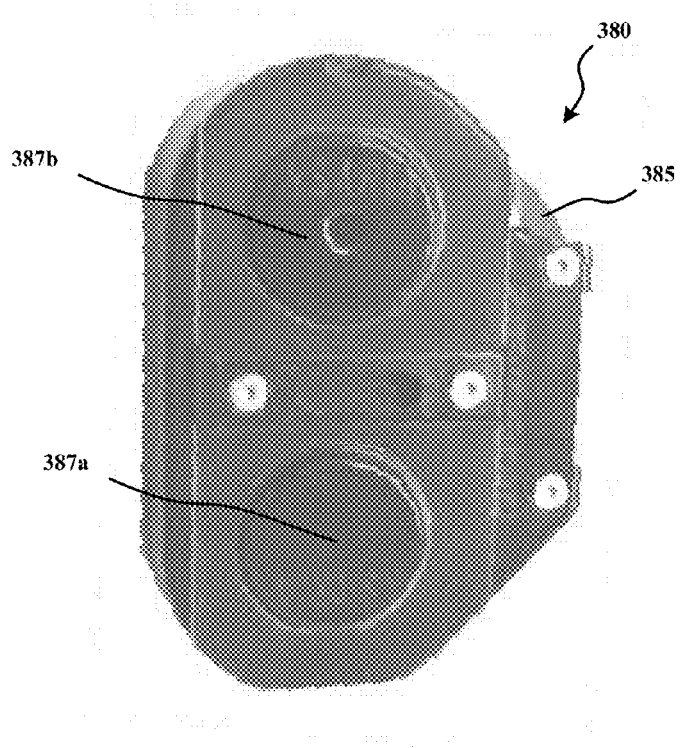
FIG. 15 shows a front view of an exemplary abrasion cassette which configured for use with the device of FIG. 11.
Figure 16:
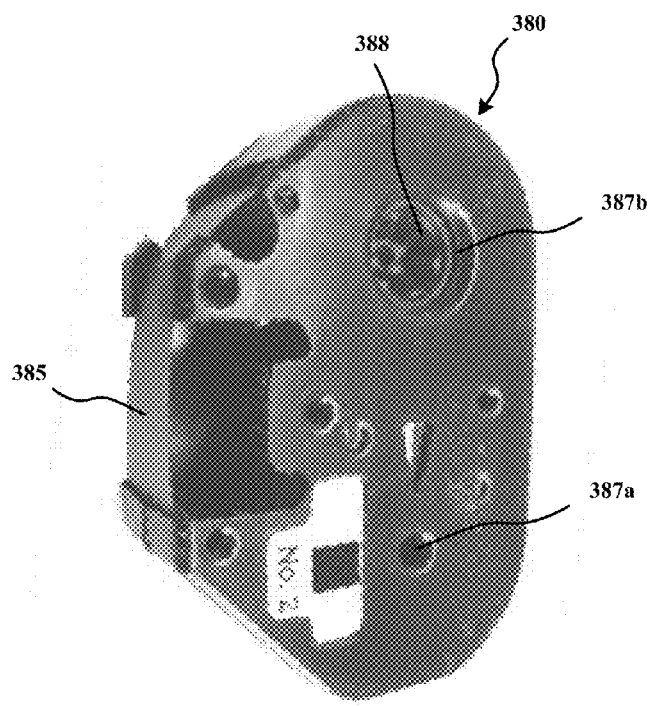
FIG. 16 shows a back view of the abrasion cassette of FIG. 15.

Referring to FIG. 13, an epoxy-removal head 350 is configured to receive an epoxy-removal cassette 380, which is illustrated, for example, in FIGS. 15 and 16. The epoxy-removal cassette 380 contains a specific grade of abrasive film tape 385, e.g., a specific grade of polishing tape, contained on feed reel 387a and take-up reel 387b.

When the abrasion cassette 380 is mounted in the abrasion head 350, the abrasive tape 385 extends over a backing pad or plate 355, which is configured to press the abrasive tape 385 into the end face of the terminus 32 during the epoxy-removal process. In operation, the head 350 is pushed against the terminus end face and moved in an orbital manner. During orbital motion, the tape 385 may be slowly dispensed automatically from the feed reel 387a to the take-up reel 387b as it is spent in the process.

In the illustrated example, the automatic tape dispensing is achieved by rotating the take-up reel 387 in order to pull the tape 385 from the feed reel 387a. The take-up reel is actuated by a keyed driver 360 of the polish head 350 configured to be received in a corresponding keyed driver receptacle 388 of the cassette 380 when the cassette 380 is inserted in the polish head 350. The keyed driver 360 may be driven and controlled via, for example, an electrical motor of the polish head 350.

Figure 14:
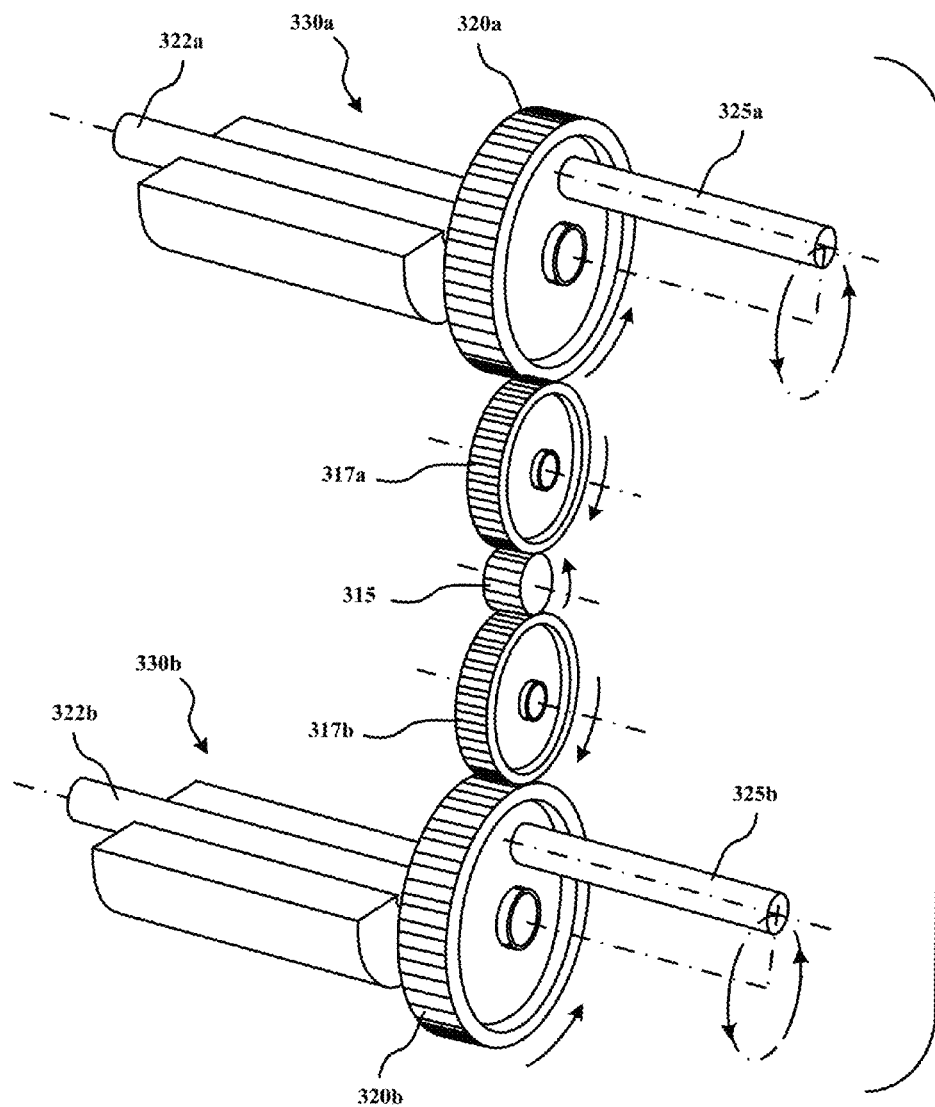
FIG. 14 shows an orbital drive system of the abrasion mechanism of the tool of FIG. 11.

Referring to FIGS. 13 and 14, in order to orbit the abrasion head 350, the abrasion head 350 is mounted on first and second orbit drivers 330a and 330b, which include the first and second orbit gears 320a and 320b, respectively. The first and second orbit drivers 330a and 330b are mounted to the frame 310 via respective first and second shafts 322a and 322b. The first and second shafts 322a and 322b are coupled to and concentric with the respective first and second orbit gears 320a and 320b, such that upon actuation of the drive gear 315 and idler gears 317a and 317b, the first and second orbit gears 320a and 320b rotate with respect to the frame 310 about the respective axes of the respective shafts 322a and 322b. The respective directions of rotation of the various components is illustrated in FIG. 14 by arrows, it being understood that reversion the direction of the drive gear 315 would reverse each of the respective directions of rotation.

The orbiting motion of the abrasion head 350 results from the mounting of the abrasion head 350 on two parallel eccentric shafts 325a and 325b. The eccentric shafts 325a and 325b are mounted to the respective orbit gears 320a and 320b at locations offset from the respective axes of the respective shafts 322a and 322b about which the respective orbit drivers 330a and 330b rotate with respect to the frame 310. Accordingly, rotation of the orbit gears 320a and 320b results in simultaneous orbiting motion of the respective first and second eccentric shafts 325a and 325b, as illustrated by broken line paths and arrows in FIG. 14. Since the polish head 350 is supported from the frame via the eccentric shafts 325a and 325b, the orbiting motion of the eccentric shafts 325a and 325b causes the epoxy-removal head 350 to orbit relative to the frame 310 correspondingly. This results in an orbiting polishing motion being applied to the end face of the terminus 32, with the backing pad/plate 355 be configured such that the backing pad/plate 355 maintains pressure of the abrasive tape 385 against the end face of the terminus 32 at all times during the orbital motion.

To counter vibration due to orbiting of the shafts 325a and 325b and the abrasion head 350, first and second eccentric counterweights 323a and 323b are mounted to the first and second shafts 322a and 322b, respectively, at positions about the respective rotation axes that are opposed to the respective positions of the first and second eccentric shafts 325a and 325b.

In order to selectably engage and disengage the abrasion head 350 from the end face of the terminus 32, an engagement actuation mechanism is provided.

Figure 18:
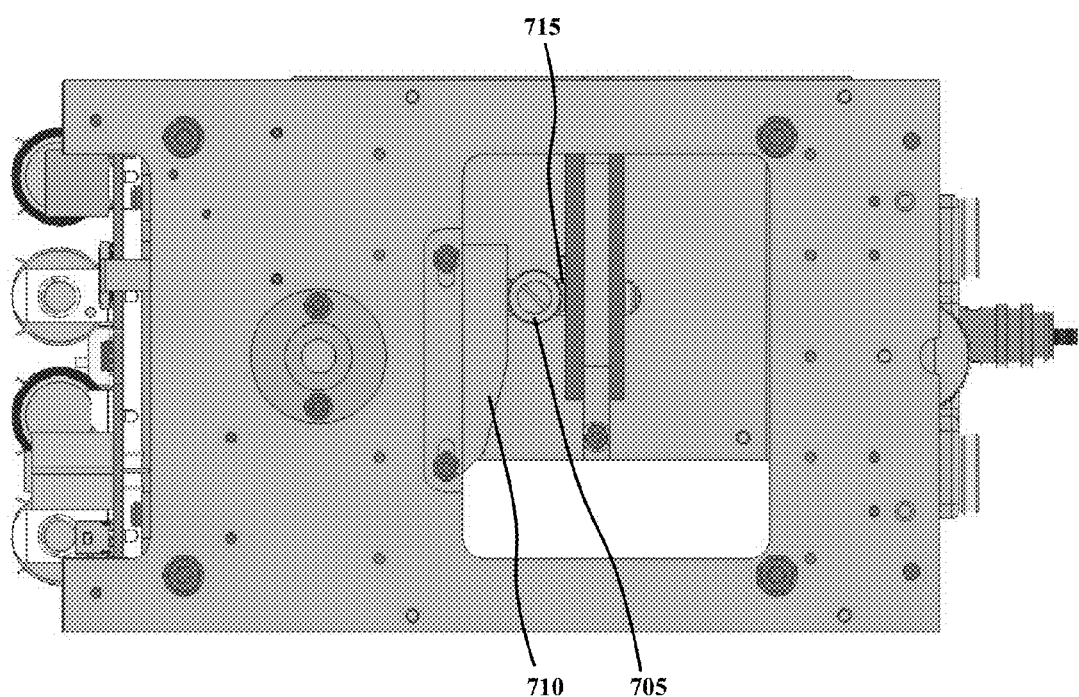
FIG. 18 shows a bottom view of a subassembly of the device of FIG. 11 with a chucked cable.

Referring to FIG. 18, the engagement actuation mechanism includes a cam follower 705 and a cam plate 710. The cam follower is attached to a shaft that extends through a cam slot 715 in the bottom plate of the index carriage 510. The shaft is connected to a counterweight plate 750 that is mounted to a linear slide to allow the counterweight plate 750 to move linearly along the x axis as the cam follower and shaft correspondingly move along the cam slot 715.

As the index carriage 510 moves laterally, along the z axis, the cam follower 705 is acted upon by the cam plate 710 to move the counterweight plate 750 axially along the x axis relative to the index carriage 510.

The counterweight plate 750 is connected to the abrasion mechanism 300 via a pivot linkage 800. The pivot linkage 800 is rotatably mounted to the index carriage 510 via a pivot joint 850 and includes a first end 805 that engages the counterweight plate 750 and an opposed second end 810 that engages the index carriage 510. It should be readily apparent that a substantial number of components of the abrasion mechanism 300 are not shown in FIGS. 19 and 20 in order to facilitate illustration.

Figure 19:
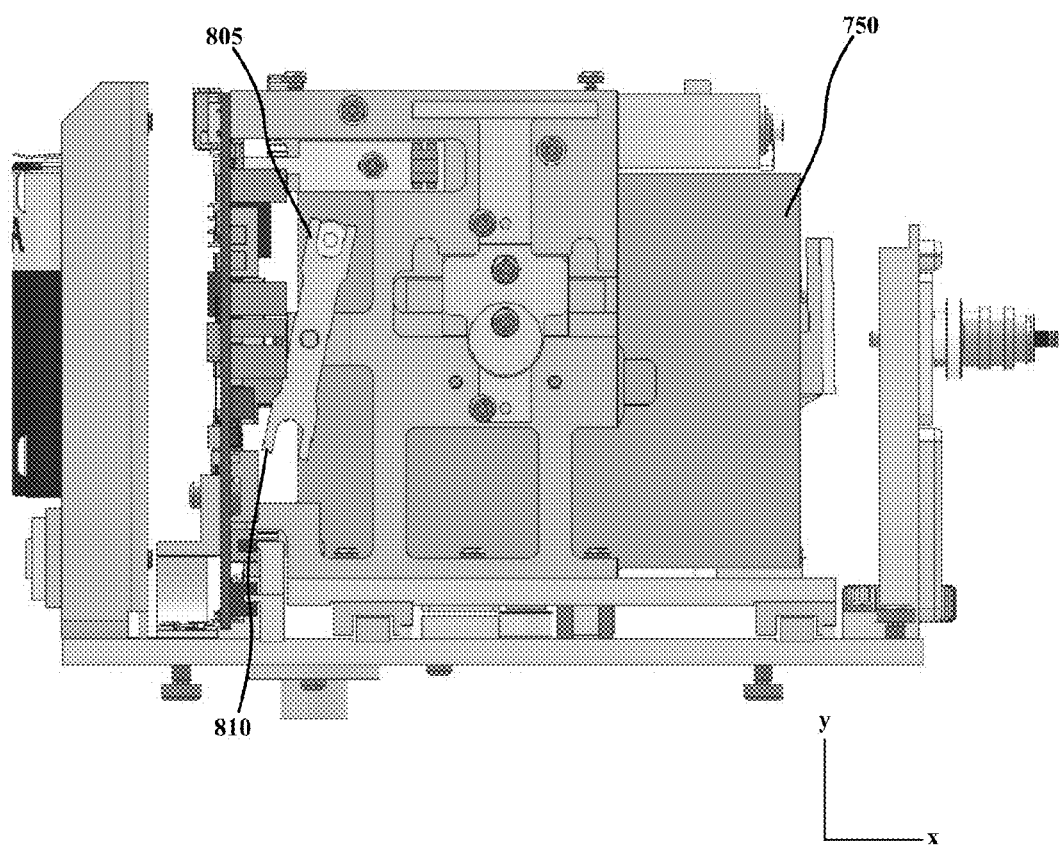
FIG. 19 shows a side view of a subassembly of the device of FIG. 11 with a chucked cable and in a state corresponding to a disengaged position of an abrasion head.

When the counterweight plate 750 moves from the position shown in FIG. 19 to the position shown in FIG. 20, the engagement of the counterweight plate 750 with the first end 805 of the pivot linkage 800 causes a rotation of the pivot linkage 800 in a counter-clockwise direction as viewed from the side as in FIGS. 19 and 20. Likewise, movement of the counterweight plate 750 in the opposite direction, e.g., from the position of FIG. 20 to the position of FIG. 19, causes a rotation of the pivot linkage 800 in the opposite direction, i.e., clockwise. Since the pivot joint 850 is disposed between the first end 805 and the second end 810 of the pivot linkage 800, movement of the counterweight plate 750 in a direction along the x axis relative to the index carriage 510 causes a corresponding movement of the abrasion mechanism 300 in the opposite direction along the x axis relative to the index carriage 510. Thus, as the counterweight plate 750 moves from the position shown in FIG. 19 to the position shown in FIG. 20, i.e., away from the cable terminus 32, the abrasion mechanism 300 moves toward and into contact with the end of the terminus 32.

A spring bias is provided to, for example, (a) bias the counterweight plate 750 along the x axis in a direction away from the terminus 32, (b) bias the abrasion mechanism 350 toward the terminus 32, and (c) bias the cam follower 705 toward the cam plate 710. This spring bias is allows the abrasion head 350 to continually apply pressure from the abrasive film to the end of the terminus during the abrasion procedure.

FIG. 20 shows a side view of a subassembly of the device of FIG. 11 in a state corresponding to an engaged position of the abrasion head 350.

Figure 10E:
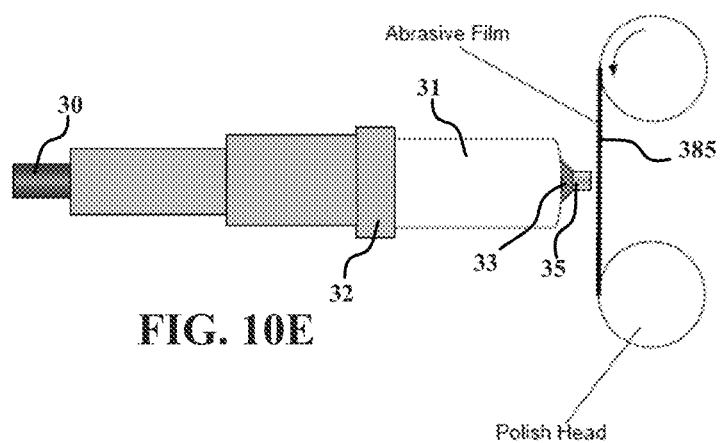
FIGS. 10E and 10F sequentially illustrate an abrasion procedure.
Figure 10F:
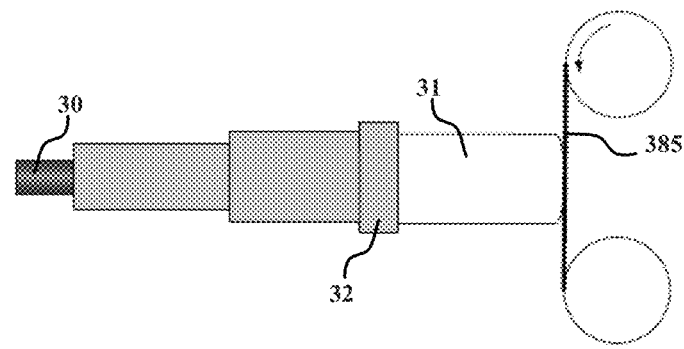

FIG. 10E shows the terminus 32 just prior to the abrasion action. FIG. 1 OF shows the end result of the abrasion process, whereby all fiber extension and epoxy extending beyond the front surface of the ferrule 31 is removed such that the polished surface remains. The finished surface has the abraded end face of the fiber 30, the abraded end face of the epoxy 33, and the end face of the ferrule, which may also be abraded, all flush with each other.

Figure 17:
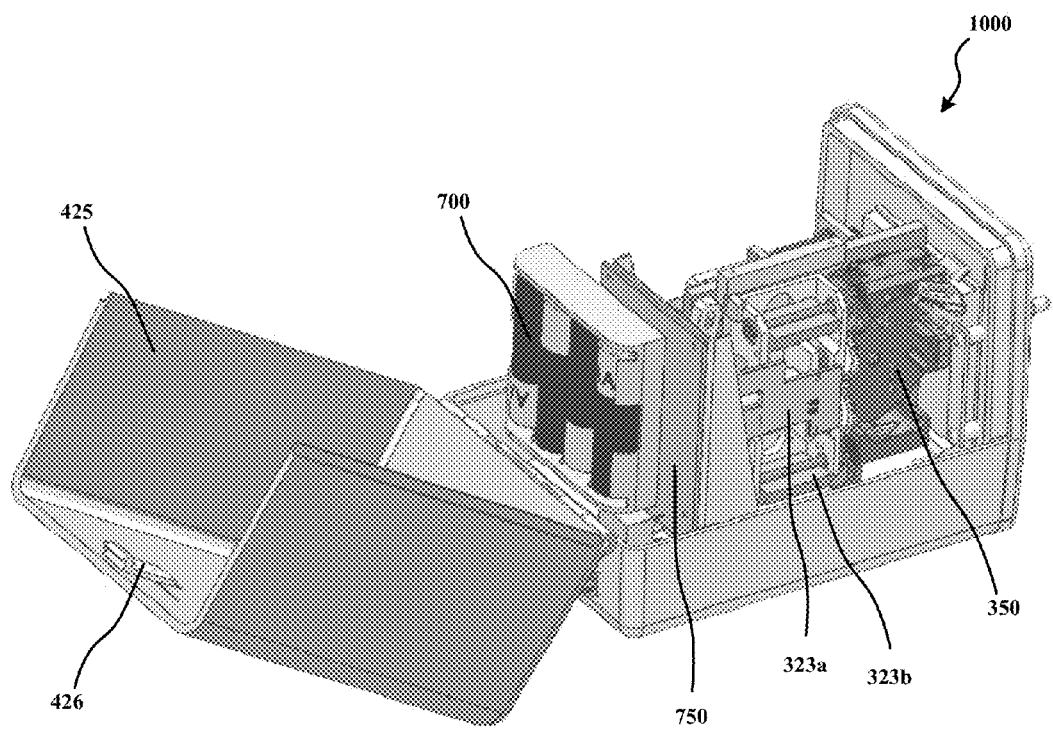
FIG. 17 shows the cleave/epoxy-removal tool of FIG. 11 in an open-hood state.

FIG. 17 shows the device 1000 with the hood open allowing access, e.g., to change the consumable items contained within the device body. The example unit 1000 is powered by batteries 700 which are located at the rear of the unit 1000.

Also shown in FIG. 17 is a main controller 750 in the example form of a printed circuit board (PCB) which is configured to provide the automatic control for the unit 1000. In this regard, the controller 750 is configured to control each of the actuators of the device 100 and to control and coordinate each of the functions of the device 1000, as well as to receive and process inputs from the operator and selectively provide feedback to the operator (e.g., via indicator lights, as illustrated in FIG. 11). In connection with the controller 750, the device 1000 may be provided with any other computational and/or memory components as may be suitable.

Figure 21:
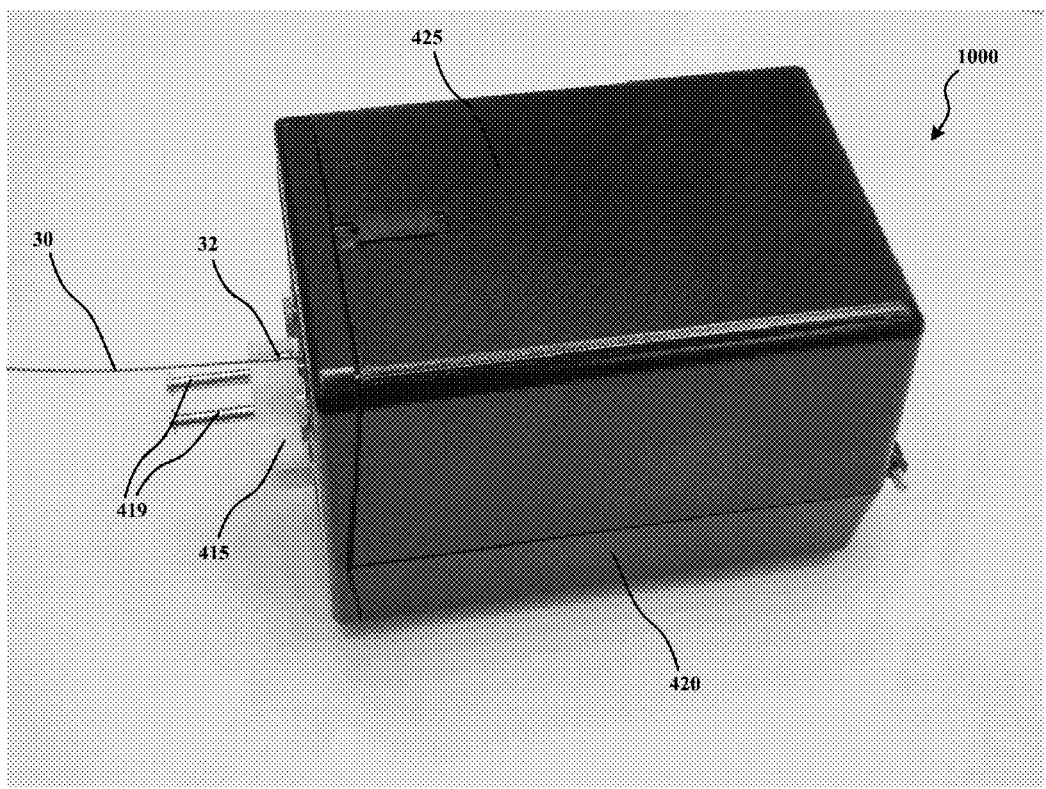
FIG. 21 shows the device of FIG. 11 with a fiber optic cable inserted in a chuck.
Figure 22:
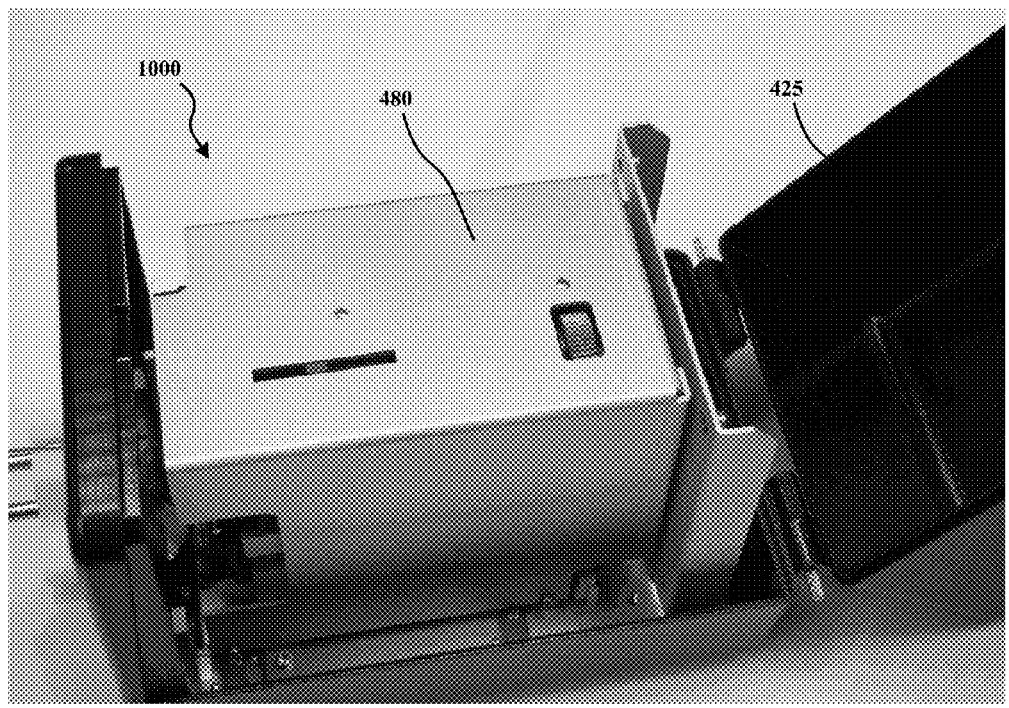
FIG. 22 shows the cleave/epoxy-removal tool of FIG. 11 in an open-hood state and with an internal cover.
Figure 23:
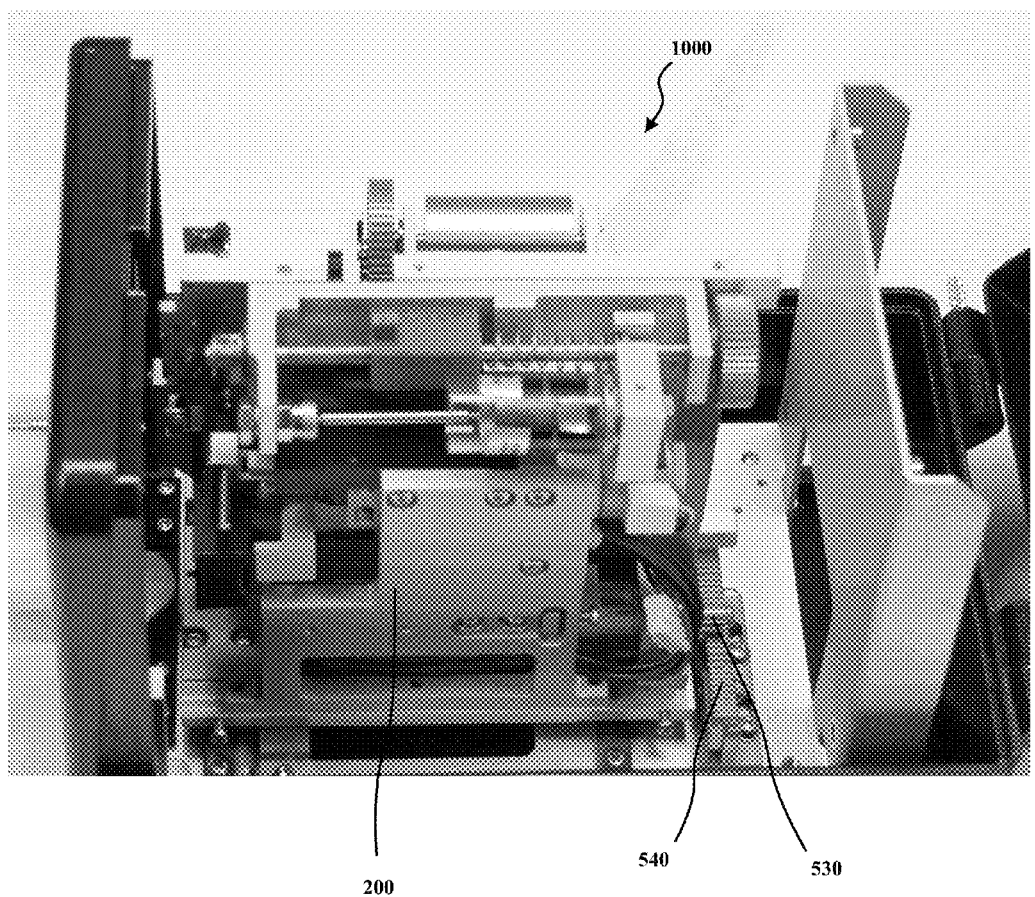
FIG. 23 shows a partial view of the cleave/epoxy-removal tool of FIG. 11 in a cleave stage.
Figure 24:
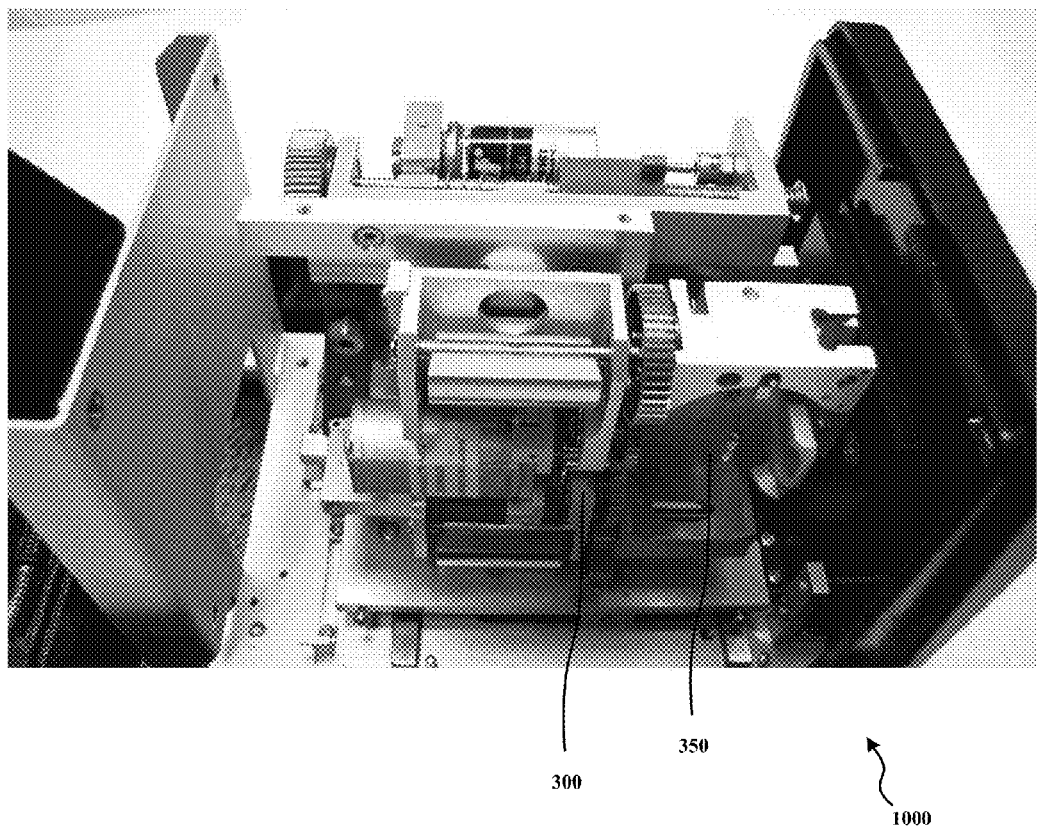
FIG. 24 shows a partial view of the cleave/epoxy-removal tool of FIG. 11 in an abrasion stage.

FIG. 21 shows the device of FIG. 11 with a fiber optic cable inserted in a chuck. FIG. 22 shows the cleave/epoxy-removal tool of FIG. 11 in an open-hood state and with an internal cover. FIG. 23 shows a partial view of the cleave/epoxy-removal tool of FIG. 11 in a cleave stage. FIG. 24 shows a partial view of the cleave/epoxy-removal tool of FIG. 11 in an abrasion stage.

FIG. 22 shows the unit 1000 with access hood 425 open which allows the operator to remove/replace the canister/cleave head 270, abrasion cassette 380, and batteries 700, and/or any other suitable components. As shown in FIG. 22, an internal housing 480 is provided, which may, inter alia, provide protection from the operator being injured by internal mechanical components.

In accordance with an example operating procedure, an operator may load the connector/terminus into the loading port according to an established procedure. The ferrule clamp may be activated, e.g., manually activated, and a "Start" button will be actuated to begin an automatic cycle in accordance the functions of the device as described herein.

The device may automatically run the full, predetermined cycle. The device may indicate the completion of the cycle via an LED. In a similar manner, any error in completing the cycle may also be indicated to the operator via an LED. The operator may release the external fiber clamp and remove the processed connector when completed.

There may be special operations to be performed by an operator. For example, the five following special operations may be performed by the operator.

The first example special operation may be to change out and replace the abrasion media, e.g., polishing media, when spent. The abrasion media may be fully contained in a cartridge that may be disposable. To change, the operator may be required to open the access door on the case of the device, remove the spent cartridge, and replace it with a new cartridge. The installation of the cartridge may provide connection to all internal mechanics and electronics with the installation. The operation may be similar to installing a cassette tape into a tape player. The device may automatically perform any required calibration, priming, and/or recognition of the media.

The second example special operation may be the exchange of the ferrule adapters for different connectors/termini. This may involve opening an access door on the case of the tool, removing one adapter and replacing it with another. The adapter may held in place with two thumb screws so no tools are required.

The third example special operation may be replacing the cleaving blade after a predetermined number of operations. The tool may keep track of the use count and the operator may be required to reset the count upon insertion of a new blade. The count may be maintained without the need for power to the unit.

The fourth special operation may be replacement of the batteries. The batteries may be accessed, for example, through a door located on the rear of the unit.

The fifth special operation may be to remove and dispose of a containment element for the waste fiber scraps that are cleaved off within the unit.

Preventative maintenance steps, for example, the lubrication of moving elements such as bearings and other drive components and calibration/verification of the fiber axial loading force mechanism, may be performed. Such step may be performed by, for example, trained personnel or provided by factory service technicians. These same drive components may also be wear items and may be checked regularly during the preventative maintenance and replaced as needed.

While various implementations of the methods and systems have been described, these implementations are exemplary and in no way limit the scope of the described methods or systems. Those having skill in the relevant art may effect changes to form and details of the described methods and systems without departing from the broadest scope of the described methods and systems. Moreover, the features of the particular examples and implementations may be used in any combination. Thus, the scope of the methods and systems described herein should not be limited by any of the exemplary implementations and should be defined in accordance with the accompanying claims and their equivalents.

What is claimed is:

1. A device comprising:
a cleaver configured to automatically cleave a bare fiber extending from an end face of a terminus or connector of a fiber optic cable, the cleaver including a stress applicator configured to stress the bare fiber and a defect-formation device configured to create a surface defect at a surface of the bare fiber under stress when the bare fiber is stressed by the stress applicator;
an abrader configured to automatically abrade the end face of the terminus or connector after the bare fiber is cleaved;
a chuck configured to receive the terminus or connector; and
an index carriage configured to selectably move between a first position in which the cleaver is aligned with the chuck and a second position in which the abrader is aligned with the chuck.

2. The device of claim 1, wherein the defect-formation device is a blade.

3. The device of claim 1, wherein the stress applicator is a bending element comprises a ramped surface configured to contact the bare fiber.

4. The device of claim 1, wherein the cleaver is driven by a linear actuator.

5. The device of claim 4, wherein a single continuous movement of the linear actuator in a single direction causes the stress applicator and the defect-formation device to initially move distally to receive the bar fiber, and subsequently move laterally.

6. The device of claim 5, wherein the defect-formation device is configured to form the surface defect upon lateral movement of the cleaver.

7. The device of claim 1, wherein the abrader comprises a plate configured to press an abrasive tape against the end face of the terminus or connector.

8. The device of claim 1, wherein the abrader comprises an abrasion head.

9. The device of claim 8, wherein the abrader is configured to move the abrasion head relative the terminus or connector in an orbiting motion.

10. The device of claim 8, wherein the abrasion head is mounted to an eccentric shaft configured to move the abrasion head relative to the terminus or connector in an orbiting motion.

11. The device of claim 10, further comprising an eccentric counterweight configured to orbit out of phase with the abrasion head when the abrasion head is moved in the orbiting motion.

12. The device of claim 1, wherein the device is battery powered.

13. A device comprising:
- a cleaver configured to automatically cleave a bare fiber extending from an end face of a terminus or connector of a fiber optic cable, the cleaver including a stress applicator configured to stress the bare fiber and a defect-formation device configured to create a surface defect at a surface of the bare fiber under stress when the bare fiber is stressed by the stress applicator;
- an abrader configured to automatically abrade the end face of the terminus or connector after the bare fiber is cleaved; and
- a controller configured to control and coordinate automatic operation of the cleaver and the abrader.

14. The device of claim 13, wherein the controller comprises a printed circuit board.

15. A method comprising:
- automatically cleaving a bare fiber extending from an end face of a terminus or connector of a fiber optic cable;
- automatically abrading the end face of the terminus or connector after the bare fiber is cleaved, the abrading causing removal of at least one of (a) an end portion of the optical fiber extending from the end face and (b) an epoxy exposed at the end face; and
- automatically transitioning between the automatically cleaving and the automatically abrading.

16. The method of claim 15, wherein the automatically cleaving includes stressing the bare fiber.

17. The method of claim 16, wherein the stressing the bare fiber includes bending the bare fiber.

18. The method of claim 16, wherein the automatically cleaving further includes creating a surface defect at a surface of the bare fiber under stress when the bare fiber is in a stressed state.

* * * * *